US007421562B2

(12) United States Patent
Bhatt et al.

(10) Patent No.: US 7,421,562 B2
(45) Date of Patent: Sep. 2, 2008

(54) DATABASE SYSTEM PROVIDING METHODOLOGY FOR EXTENDED MEMORY SUPPORT

(75) Inventors: Vadiraja Bhatt, Pleasanton, CA (US); Praveen Vegulla, San Jose, CA (US); Prasanta Ghosh, San Ramon, CA (US); Girish Vaitheeswaran, Fremont, CA (US)

(73) Assignee: Sybase, Inc., Dublin, CA (US)

( * ) Notice: Subject to any disclaimer, the term of this patent is extended or adjusted under 35 U.S.C. 154(b) by 401 days.

(21) Appl. No.: 10/710,381

(22) Filed: Jul. 6, 2004

(65) Prior Publication Data

US 2005/0193160 A1    Sep. 1, 2005

Related U.S. Application Data

(60) Provisional application No. 60/521,158, filed on Mar. 1, 2004.

(51) Int. Cl.
*G06F 9/28* (2006.01)
(52) U.S. Cl. .................................. 711/203; 711/122
(58) Field of Classification Search .............. 711/203
See application file for complete search history.

(56) References Cited

U.S. PATENT DOCUMENTS

| 5,680,573 | A | 10/1997 | Rubin et al. ................. 711/129 |
| 5,706,506 | A | 1/1998 | Jensen et al. ................. 707/103 |
| 5,727,203 | A | 3/1998 | Hapner et al. ................ 707/103 |
| 5,799,210 | A | 8/1998 | Cohen et al. .................. 710/56 |
| 5,812,996 | A | 9/1998 | Rubin et al. .................... 707/2 |
| 5,822,749 | A | 10/1998 | Agarwal ....................... 707/2 |
| 5,826,253 | A | 10/1998 | Bredenberg .................... 707/2 |
| 5,829,022 | A | 10/1998 | Wantanabe et al. .......... 711/118 |
| 5,897,634 | A | 4/1999 | Attaluri et al. ................ 707/8 |
| 5,940,827 | A | 8/1999 | Hapner et al. .................. 707/8 |
| 5,974,129 | A | 10/1999 | Bodnar .................. 379/220.01 |
| 6,061,763 | A | 5/2000 | Rubin et al. ................. 711/129 |

(Continued)

OTHER PUBLICATIONS

American National Standards Institute, Information Technology-Database languages—SQL (Ch 4), American National Standard ANSI/ISO/IEC 9075: 1992.

(Continued)

*Primary Examiner*—Kevin Ellis
*Assistant Examiner*—Hamdy S Ahmed
(74) *Attorney, Agent, or Firm*—John A. Smart; G. Mack Riddle

(57) ABSTRACT

A database system providing methodology for extended memory support is described. In one embodiment, for example, a method is described for extended memory support in a database system having a primary cache, the method comprises steps of: creating a secondary cache in memory available to the database system; mapping a virtual address range to at least a portion of the secondary cache; when the primary cache is full, replacing pages from the primary cache using the secondary cache; in response to a request for a particular page, searching for the particular page in the secondary cache if the particular page is not found in the primary cache; if the particular page is found in the secondary cache, determining a virtual address in the secondary cache where the particular page resides based on the mapping; and swapping the particular page found in the secondary cache with a page in the primary cache, so as to replace a page in the primary cache with the particular page from the secondary cache.

45 Claims, 15 Drawing Sheets

U.S. PATENT DOCUMENTS

| | | | |
|---|---|---|---|
| 6,070,165 A | 5/2000 | Whitmore | 707/101 |
| 6,115,703 A | 9/2000 | Bireley et al. | 707/2 |
| 6,199,141 B1 | 3/2001 | Weinreb et al | 711/118 |
| 6,216,212 B1 | 4/2001 | Challenger et al. | 711/163 |
| 6,243,719 B1 | 6/2001 | Ikuta et al. | 707/204 |
| 6,256,712 B1 | 7/2001 | Challenger et al. | 711/141 |
| 6,308,169 B1 | 10/2001 | Ronstrom et al. | 707/2 |
| 6,321,235 B1 | 11/2001 | Bird | 707/203 |
| 6,353,833 B1 | 3/2002 | Bird et al. | 707/201 |
| 6,370,614 B1 * | 4/2002 | Teoman et al. | 711/113 |
| 6,381,596 B1 | 4/2002 | Bayer | 707/4 |
| 6,411,968 B2 | 6/2002 | Bamford et al. | 707/202 |
| 6,453,321 B1 | 9/2002 | Hill et al. | 707/103 |
| 6,457,020 B1 | 9/2002 | Carey et al. | 707/103 |
| 6,457,021 B1 | 9/2002 | Berkowitz et al. | 707/201 |
| 6,480,944 B2 * | 11/2002 | Bradshaw et al. | 711/162 |
| 6,487,641 B1 | 11/2002 | Cusson et al. | 711/144 |
| 6,493,810 B1 | 12/2002 | Pang et al. | 711/170 |
| 6,502,108 B1 | 12/2002 | Day, III et al. | 707/203 |
| 6,557,082 B1 | 4/2003 | Josten et al. | 711/141 |
| 6,564,230 B2 | 5/2003 | Bamford et al. | 707/200 |
| 6,591,266 B1 | 7/2003 | Li et al. | 707/10 |
| 6,598,119 B2 | 7/2003 | Becker et al. | 711/119 |
| 6,609,126 B1 | 8/2003 | Smith et al. | 707/8 |
| 6,633,862 B2 | 10/2003 | Thompson | 707/1 |
| 6,701,359 B1 | 3/2004 | Calabrez et al. | 709/223 |
| 6,718,349 B2 | 4/2004 | Weedon | 707/201 |
| 6,728,840 B1 | 4/2004 | Shatil et al. | 711/137 |
| 6,741,997 B1 | 5/2004 | Liu et al. | 707/102 |
| 6,769,048 B2 | 7/2004 | Goldberg et al. | 711/141 |
| 6,772,179 B2 | 8/2004 | Chen et al. | 707/204 |
| 6,789,170 B1 | 9/2004 | Jacobs et al. | 711/133 |
| 6,792,436 B1 | 9/2004 | Zhu et al. | 707/203 |
| 6,795,898 B2 | 9/2004 | Weinreb et al. | 711/119 |
| 6,829,680 B1 | 12/2004 | Sugumar et al. | 711/137 |
| 6,836,774 B2 | 12/2004 | Melbin | 707/10 |
| 6,848,028 B1 | 1/2005 | Sugumar et al. | 711/137 |
| 6,877,066 B2 | 4/2005 | Benfield et al. | 711/118 |
| 6,898,603 B1 | 5/2005 | Petculescu et al. | 707/101 |
| 7,124,249 B1 * | 10/2006 | Darcy | 711/122 |
| 2003/0162544 A1 * | 8/2003 | Austin et al. | 455/445 |
| 2004/0103251 A1 * | 5/2004 | Alsup | 711/122 |

OTHER PUBLICATIONS

Synder, Peter, tmpfs: A virtual Memory File System, Sun Microsystems.

Date, C.J., An Introduction to Database Systems, Ch 1: Overview of Database Management, vol. 1, 5th Ed., 1990.

* cited by examiner

DATABASE SYSTEM PROVIDING METHODOLOGY FOR EXTENDED MEMORY SUPPORT

CROSS REFERENCE TO RELATED APPLICATIONS

The present application is related to and claims the benefit of priority of the following commonly-owned, presently-pending provisional application(s): application Ser. No. 60/521,158, filed Mar. 1, 2004, entitled "Database System Providing Methodology for Extended Memory Support", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size 21 KB, created Mar. 1, 2004 5:43 PM; Object ID: File No. 1; Object Contents: Source Code.

BACKGROUND OF INVENTION

1. Field of the Invention

The present invention relates generally to information processing environments and, more particularly, to a database system providing methodology for extended memory support.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000, the disclosure of which is hereby incorporated by reference.

Database systems are well known and in wide use in a wide range of applications running on a variety of different hardware and operating system platforms. However, the use of database systems on certain platforms is hindered by the limited addressable memory that is available on these platforms. For example, one platform that is in use today is the Linux operating system running on a hardware platform that utilizes 32-bit processors (e.g., Intel 32-bit processors). Using this Linux 32-bit platform can provide a cost effective solution for enterprise level information technology requirements as it can be a less expensive solution than 64-bit architectures. However, applications running on this platform currently have a limitation of only being able to use less than 4 GB (addressable range) of memory on 32-bit architectures. Standard 32-bit addresses can map a maximum of 4 GB of memory. By default, a portion of this memory (e.g., 1 GB or 2 GB) is typically reserved for the operating system, and therefore in practice less than 4 GB is available to an application running on a 32-bit platform. Given that most database server installations are larger than 4 GB, a mechanism for overcoming the memory limitations of these 32-bit platforms is needed in order to facilitate the use of database applications on these platforms.

One current technology that can be used to address this limitation is an Intel "Physical Address Extension" (PAE) technology which allows more RAM to be used with certain 32-bit systems. Generally, PAE makes 4 extra bits available for the addressing of memory, thereby allowing up to 64 GB of memory to be addressed. With PAE, a system (e.g., an Intel Xeon-based system) can house up to 64 GB of memory on 32-bit platforms as 16 segments of 4 GB per segment. Briefly, PAE is a memory management function that provides more physical memory to a program (e.g., application program) that requests memory. The program (e.g., application) is usually not aware that any of the memory that it uses resides in the range greater than 4 GB. With PAE enabled, the operating system essentially moves from a two-level linear address translation to a three-level address translation. The extra layer of translation is what provides access to physical memory beyond 4 GB. Instead of a linear address being split into three separate fields for indexing into memory tables, it is usually split into four separate fields; a 2-bit field, two 9-bit fields, and a 12-bit field that corresponds to the page size implemented by the Intel architecture (4 KB).

During a context switch a register (e.g., a CR3 register) is set by the operating system to point to a page directory pointer index that is 2-bits wide. The first two bits are used as an index into this table, with the resulting value pointing to a page directory. The first 9-bit field is then used to index into the page directory. The indexed value then points to a page table. The second 9-bit field is an index into the page table. This value points to the actual page in memory where the desired byte is located. Finding this byte is a matter of using the remaining twelve bits of data to index into the page.

PAE allows a processor to address up to 64 GB in theory but, in practice, applications still may not be able to access that much memory without the use of other mechanisms.

Currently, an application using the additional memory provided by PAE has to move from segment to segment and keep track of its position. The memory is not mapped by the operating system for the application, so that the application can simply open an address from 0 to 64 GB. Rather, the application itself must generally manage, on its own, the mapping to the extended memory.

Operating system (OS) vendors have provided some mechanisms and application programming interfaces (APIs) to allow applications to address more than 4 GB of memory (RAM) on 32-bit platforms using PAE. For example, on certain Microsoft Windows platforms (e.g., Windows 2000) an "Address Windowing Extensions" or "AWE" API is available to support larger amounts of physical memory. AWE is a set of extensions to the memory management functions of the Microsoft Win32 API that allow applications to address more memory than the 4 GB that is available through standard 32-bit addressing. AWE lets applications acquire physical memory as non-paged memory, and then dynamically map views of the non-paged memory to the 32-bit address space. Although the 32-bit address space is limited to 4 GB, the non-paged memory can be much larger. This process enables memory-intensive programs, such as large database systems, to reserve large amounts of physical memory for data without having to be paged in and out of a paging file for usage. Instead, the data is swapped in and out of the working set and reserved memory is in excess of the 4 GB range. Although the Address Windowing Extensions enable memory-intensive applications (e.g., large database systems) to address more memory than can be supported in a 32-bit address space, the AWE mechanism is available only certain Windows platforms and is currently not supported on other platforms (e.g., Linux platforms).

Although the above discussion refers to the addressable memory limitations of 32-bit platforms, this is only one example of a more general problem. Memory limitations may also be applicable and may impact the performance of database systems on various other platforms. Given any arbitrary physical memory constraint that may be applicable, what is needed is a solution that enables memory-intensive applications, such as large database systems, to utilize extended memory for overcoming these limitations. For example, one may wish to implement an application in an environment in which a portion of the memory for the application is provided on a first device and another portion of the memory is provided on a second device (e.g., a less expensive device such as a file server or the like). Consider, for instance, an environment including a cluster of machines. It is would be desirable to be able to provide extended memory on various machines in the cluster and have a mechanism that mapped to extended memory located anywhere in the cluster. What is needed is a system and methodology for mapping to extended memory on various devices so that an application can bring data in from various sources without needing to know or be concerned about the underlying location of this data.

In a typical database application, the memory that is required by the database system is mostly used for data caches. For example, all or portion of a table or index is loaded from disk into cache memory to facilitate access to such data and avoid expensive disk reads and writes which can also serve to increase latency. In a typical database server implementation, a major portion of memory utilization (e.g., on the order of 90 percent of memory utilization) relates to data caches, while a much smaller portion (e.g., the remaining 10 percent) relates to connection caches and other miscellaneous purposes. What is needed is a solution providing for caching data in memory which reduces the frequency of read and write operations from disk, thereby reducing the impact of these operations on system performance.

One approach that has been used in an attempt to overcome the memory limitations of certain platforms is to use operating system provided file systems or other such devices to provide extended memory to an application. However, in a transaction processing environment, a mechanism of this type (e.g., an operating system file system) does not support the transaction needs of a database server system. For one thing, using this type of mechanism makes it very difficult to optimize the execution of transactions. Also, this mechanism is not extensible and it usually forces one to choose one particular interface on a particular platform. A more flexible and extensible approach that can be plugged into various implementations in order to provide extended memory support to memory-intensive applications is desired.

What is needed is a solution which enables memory intensive applications, such as large database systems, to address more memory than can be supported in the address space of a given platform (e.g., a 32-bit platform). Ideally, the solution should provide extended memory support without requiring the application using the extended memory to be concerned about the details involved in mapping to or otherwise managing the extended memory. The present invention provides a solution for these and other needs.

SUMMARY OF INVENTION

A database system providing methodology for extended memory support is described. In one embodiment, for example, a method of the present invention is described for extended memory support in a database system having a primary cache, the method comprises steps of: creating a secondary cache in memory available to the database system; mapping a virtual address range to at least a portion of the secondary cache; when the primary cache is full, replacing pages from the primary cache using the secondary cache; in response to a request for a particular page, searching for the particular page in the secondary cache if the particular page is not found in the primary cache; if the particular page is found in the secondary cache, determining a virtual address in the secondary cache where the particular page resides based on the mapping; and swapping the particular page found in the secondary cache with a page in the primary cache, so as to replace a page in the primary cache with the particular page from the secondary cache.

In another embodiment, for example, a database system of the present invention providing extended memory support is described that comprises: a primary cache for maintaining data pages used by the database system in addressable memory available to the database system; a secondary cache for maintaining data pages replaced from the primary cache in extended memory available to the database system; a search module for receiving a request from a user for a particular data page and determining whether the particular data page is in secondary cache if the particular data page is not in the primary cache; and a module for replacing a data page in the primary cache with the particular data page from the secondary cache if the particular data page is found in the secondary cache.

DETAILED DESCRIPTION

Glossary

Figure 1:
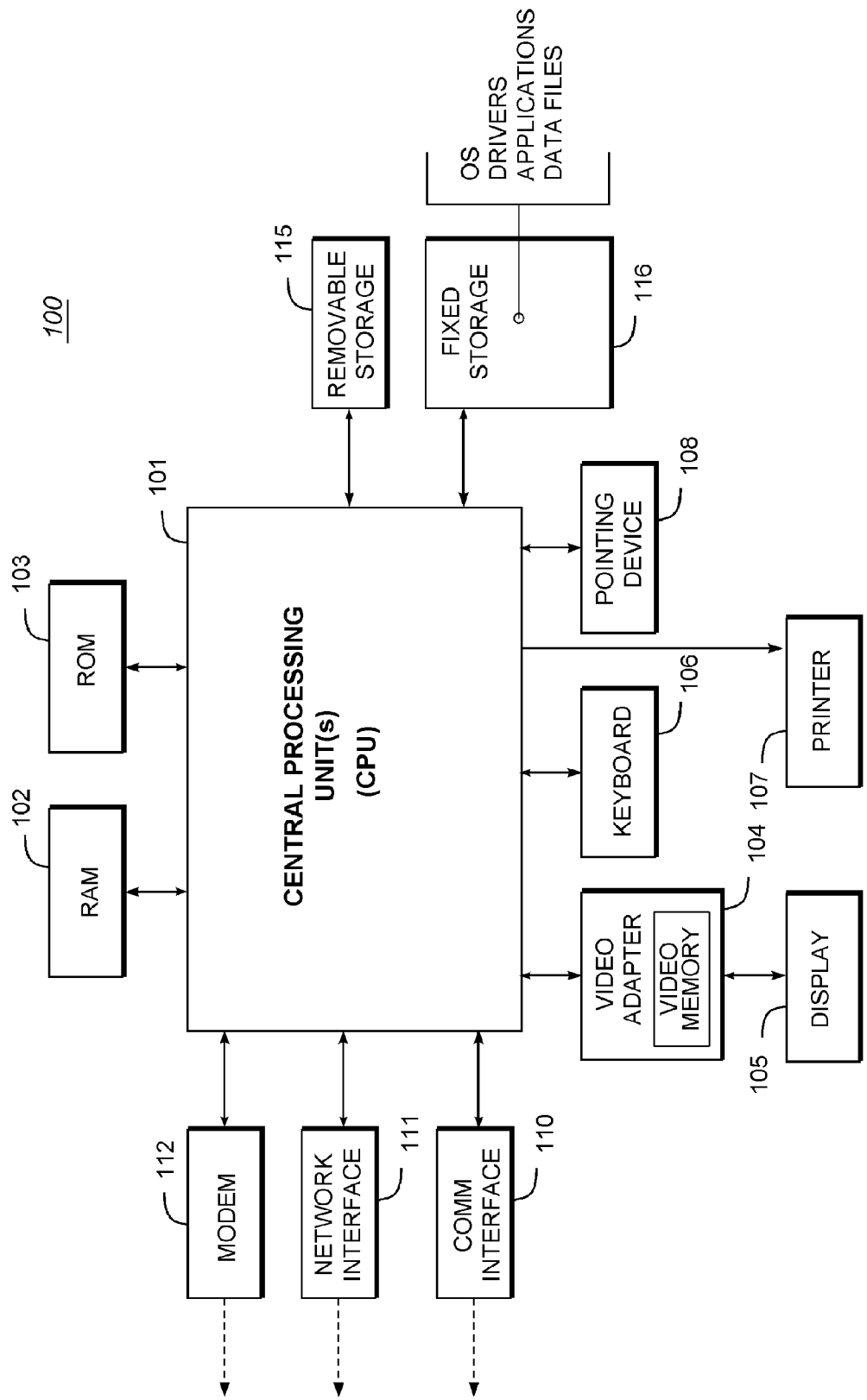
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

Shmfs: Shmfs refers to shared memory file system (also sometimes referred to as virtual memory file system), which is a file system that keeps files in virtual memory. The shared memory file system (shmfs) is included as a component of the 32-bit Linux operating systems, including Red Hat Linux 3.0 and SuSe Linux 8.0. Like tmpfs (defined below), shmfs is a file system type that works directly in the memory management code of the kernel.

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Seventh Edition", Addison Wesley, 2000, the disclosure of which is hereby incorporated by reference.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

Tmpfs: Tmpfs (tmpfs) stands for temporary file system, which is a file system which keeps all files in virtual memory. This file system is temporary in the sense that no files are created on a system's hard drive and if the system is rebooted the files in tmpfs will be lost. In contrast to RAM disks, which get allocated a fixed amount of physical RAM, tmpfs grows and shrinks to accommodate the files it contains and is able to swap unneeded pages out to swap space. Tmpfs does not use traditional non-volatile media to store file data; instead, tmpfs files exist solely in virtual memory maintained by the operating system kernel (e.g., a UNIX or LINUX operating system kernel). Because tmpfs file systems do not use dedicated physical memory for file data but instead use virtual memory system resources and facilities, they can take advantage of kernel resource management policies. Tmpfs is designed primarily as a performance enhancement to allow short-lived files to be written and accessed without generating disk or network input/output (I/O). For further information on tmpfs, see e.g., Synder, P., "tmpfs, A Virtual Memory File System", available from Sun Microsystems, Inc., the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
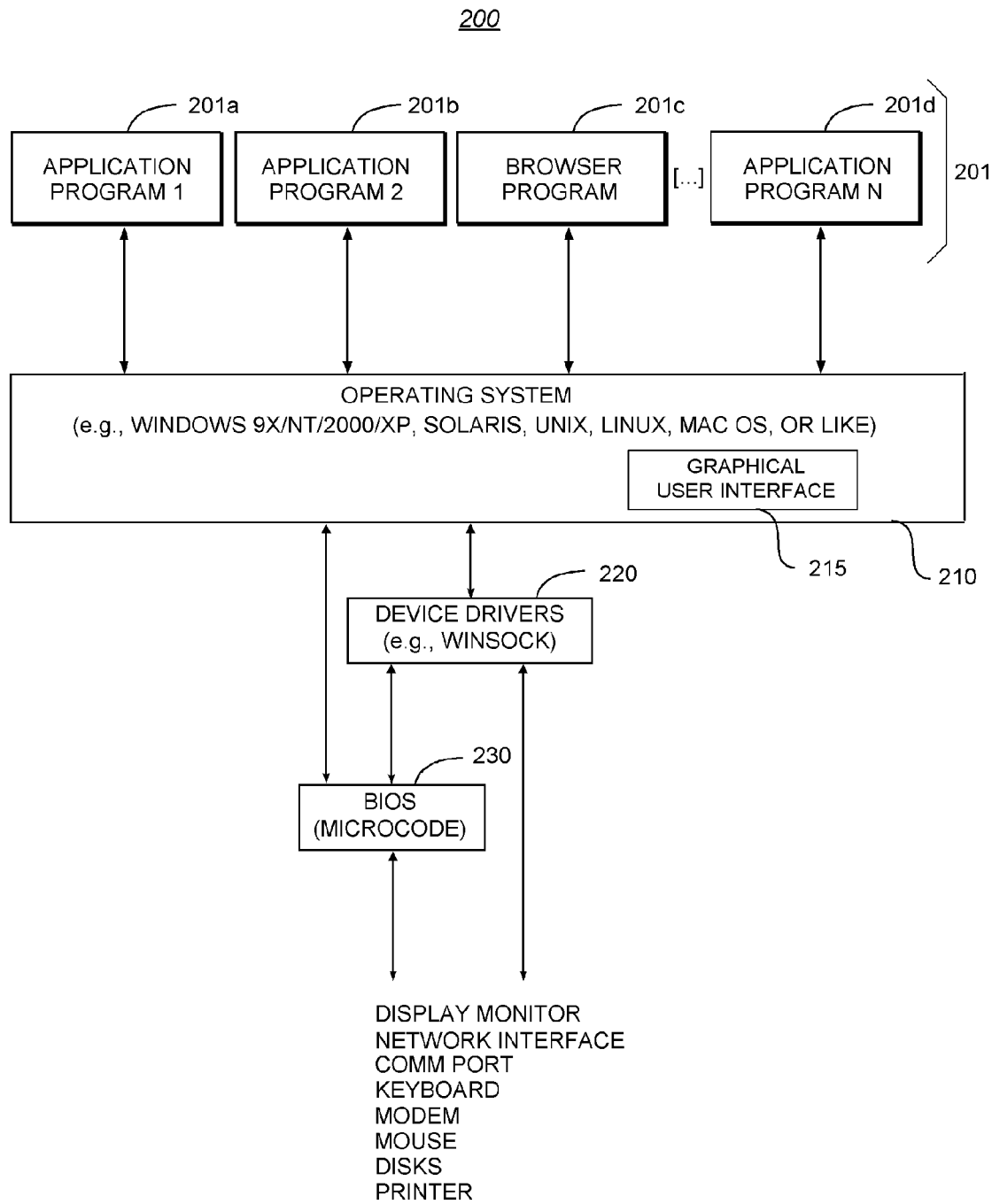
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of down-loadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-server Database Management System

Figure 3:
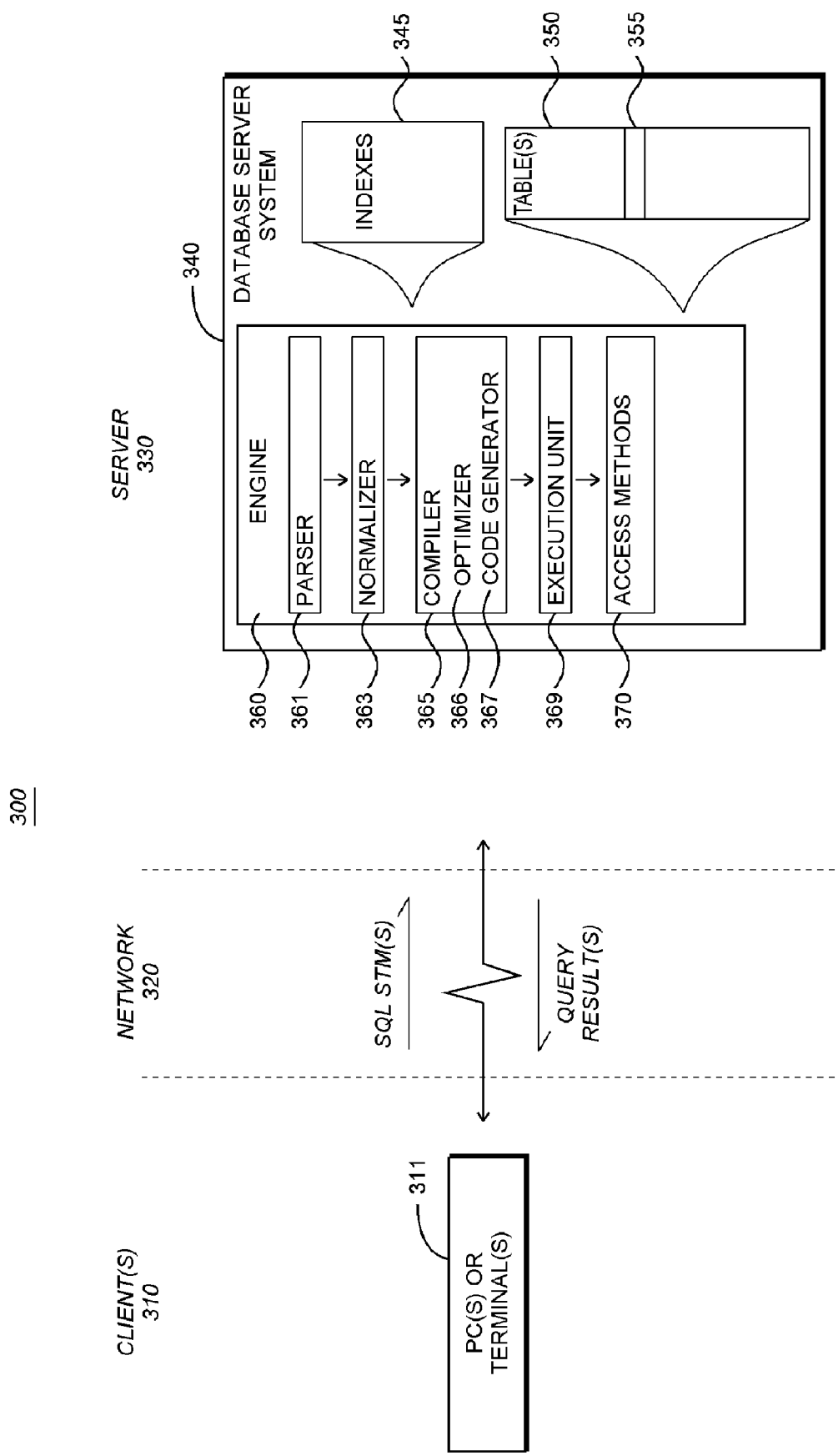
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), or Linux (Red Hat). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5 Product Documentation", available from Sybase, Inc. of Dublin, Calif. This product documentation is available via the Internet (e.g., currently at sybooks.sybase.com/asg1250e.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields". A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems". In addition to retrieving the data from database server table(s) 350, the clients 310 also include the ability to insert new rows of data records into the table. In addition, the clients can also modify and/or delete existing records in the table(s).

In operation, the SQL statements received from the client(s) 310 (via network 320) are processed by the engine 360 of the database server system 340. The engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer is responsible for optimizing the query tree. The optimizer 366 performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and selects the best execution plan, which in turn results in particular access methods being invoked during query execution.

For enhancing the storage, retrieval, and processing of data records, the server 330 maintains one or more database indexes 345 on the database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. An index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion.

Instead, the present invention may be implemented in any type of system architecture or processing environment capable of supporting the methodologies of the present invention presented in detail below.

Overview of Database System Providing Methodology for Extended Memory Support

Shared Secondary Cache

In operation, a database system needs to be able to allocate memory to hold things such as indexes, tables, and the like. It is advantageous to cache this type of data in memory so that the data does not have to be brought into memory from an external source (e.g., disk) each time an operation on the data is to be performed. However, as described above, hardware platforms have limitations on the memory that is available to database applications for these purposes. For example, on certain 32-bit platforms (e.g., Intel-based 32-bit hardware platforms running the Linux operating system) less than 4 GB of addressable memory is available. The present invention provides extended memory support enabling memory-intensive applications to be used on systems having these types of limitations.

As described above, the primary cache that is available to an application (e.g., a database server) is often limited. To the extent that the data used by the application is not available in the primary cache, it needs to be brought in from another source (e.g., from disk or other external storage). However, disk reads/writes are expensive and adversely impact performance of the application. The present invention provides extended memory support though the creation of a secondary cache which acts like a swap space for the primary cache. As described below in greater detail, the methodology of the present invention provides for one global secondary cache which is shared by all of the primary cache. This secondary or "e xtended" cache serves a similar role to that of a second level cache (L2 cache) associated with a processor. Pages from the primary data cache spill over to the secondary cache. Data pages are replaced from the primary cache as part of buffer wash operation. In operation, if a page is not found in the primary cache, the secondary (extended cache) is searched for the page. If found, the page is brought into the primary cache from the secondary cache, thereby avoiding the need to read the page in from disk.

In its currently preferred embodiment, the present invention makes use of a shared memory file system feature ("shmfs") and a memory mapped file feature ("mmap") available on Linux platforms. A shmfs file is created and the database system maps a virtual address range (window) to the portion of the shmfs file through the mmap interface. This mechanism enables the database system to address a portion of memory mapped shmfs file whose size can be as large as 64 G. This memory mapped file space is used as a secondary cache from which the system replaces the pages from the primary cache. The system can also search the secondary cache to see if a given page is cached in the secondary cache. While searching for a given page, if that page is cached in the secondary cache, the system maps a virtual address window to that portion of the shmfs where the page resides and copies it to the primary cache. By doing so, the system avoids disk reads while making effective use of memory through the shmfs file system interface.

The system and methodology of the present invention is currently commercially embodied as a component of a Sybase® Adaptive Server® Enterprise database system (from Sybase, Inc. of Dublin, Calif.) running on the Linux operating system and provides extended memory support while at the same time minimizing the resources required to deliver this functionality. The system of the present invention can also be modularized in its implementation so that it will not affect existing functionalities of the database system in which it is implemented. Before describing the system and methodology of the present invention in more detail, some other alternative approaches will be discussed.

Virtual Address Window for Each Database Engine

One class of solutions for providing extended memory support provides for creating a window of virtual addresses in each database engine. These virtual addresses can either map/unmap dynamically or map permanently to a physical address in that engine. On Linux systems this is typically implemented by using a "window" of virtual address space, which keeps moving over a shared memory file system.

The Sybase® Adaptive Server® Enterprise database management system in which the present invention is commercially embodied includes a native thread implementation to serve each database user. In the currently preferred embodiment, each operating system (OS) process is a database server engine and each engine is capable of managing many user threads. Also, threads can move freely from one engine to another because the entire context associated with a thread is in shared memory and shared memory is visible to all of the database server engines. This provides for efficiency in terms of load balancing and resource utilization.

With the above architecture in place one cannot follow the threading model as seen in certain other database engines where each engine can be a thread (i.e., any mapping that happens at the process level can be seen by all the threads). Although this approach of having each engine as a thread is an inexpensive way of addressing more than 4 GB of memory, it requires substantial change in database systems that do not currently implement engines as operating system (OS) threads. The present invention provides for extended memory support in a database system without requiring the database system to be re-written to implement database engines as operating system threads.

Statically Mapped Window

Another possible approach for providing extended memory support is to utilize a statically mapped window. This statically mapped window approach provides for reserving a certain amount of memory (e.g., 500 MB) as a virtual address space. Engines are then spawned to map this 500 MB of virtual address space to a physical address, (e.g., for 16 GB of main memory approximately 28 engines would be spawned—(16−2.2)/0.5=28 engines). Each engine essentially "owns" (i.e., is responsible for) extended memory of 500 MB. A global chain of auxiliary buffers, which are visible on all engines, is also maintained. From this chain each engine knows at which engine a given auxiliary buffer resides. During a buffer replacement (i.e., bufgrab) the following occurs: (1) unhash the grabbed buffer; (2) switch from the current engine to where the target auxiliary buffer resides; and (3) swap the content of the buffer with the auxiliary buffer. The benefits of this statically mapped window approach include that there is no map/unmap operation required, and no shmfs (shared memory file system) or tmpfs (temporary file system) on the extended memory. The disadvantages include copying (minimum of 2 copies), task context switch to a different engine, and too many engines.

A statically mapped window system incurs a context switch from engine to engine when accessing a targeted page. Additionally, this approach means that the washing mechanism needs to extend to the extended memory, and unnecessary writes should not be issued. Another consideration is that the log cannot use extended memory. A checkpoint needs to be established to take into account flushing extended memory. Resource overhead also is a consideration when using a statically mapped window. The extended cache has to have an engine local LRU/MRU (least recently used/most recently used) chain. The solution also requires a global hash function, in the shared memory, to access the auxiliary buffer. In addition, a window of addresses needs to be reserved to access the auxiliary buffers.

Shmfs/tmpfs on the Extended Memory with Multiple Addresses for a Given Page

Another approach provides for using shmfs/tmpfs (shared memory file system/temporary memory file system) on the extended memory with multiple addresses for a given page. In implementing this solution, a memory mapped file system is created, and using a window this system can map or unmap at various offsets on the file. This method has multiple addresses for a given page and each in-memory page has an engine-specific virtual address. The entire buffer cache is in the shmfs (shared memory file system) and pages from the disk are brought into the shmfs.

Figure 4:
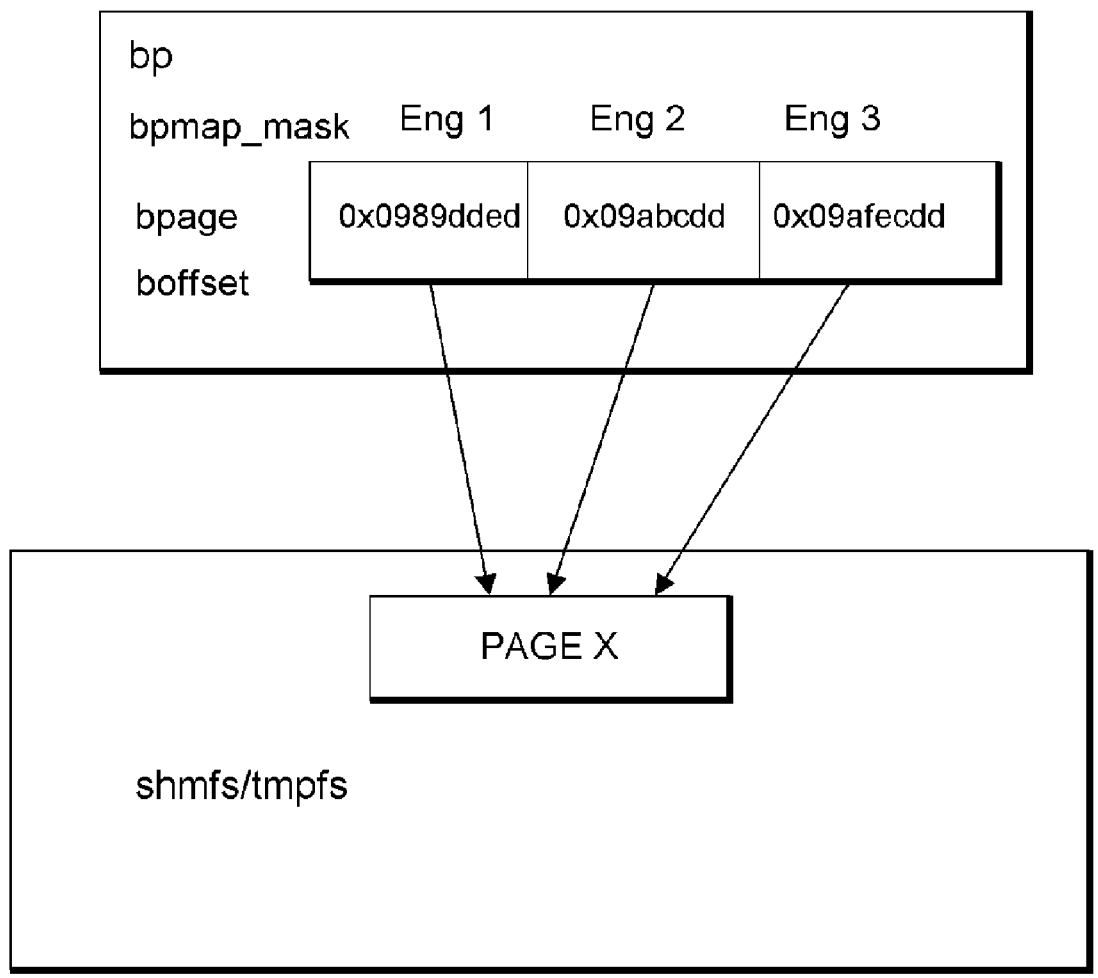
FIG. 4 is a block diagram which illustrates this approach of creating shmfs/tmpfs on the extended memory.

FIG. 4 is a block diagram which illustrates this approach of creating shmfs/tmpfs on the extended memory. As shown at FIG. 4, each buffer pool (bp) has an array of bpage pointers. Each engine has a corresponding bpage pointer. Whenever a page is accessed the page must be mapped currently to a virtual address on the engine where it is being accessed. Each buffer may also need to have an array of bits (engine masks) indicating whether the page is mapped on that engine or not. Previously, in cases where bp->bpage.anp would have been accessed, now bp->bpage[ENGINE_NUMBER].anp needs to accessed instead. A boffset field which is at least 36 bits long to indicate the offset in the shared memory is also required. The routine to access a buffer is as follows:

```
1:      If(bufsearch( ) returns success)
2:      {
3:          if(buffer is not mapped)
4:          {
5:              free_addr = grabVirtualAdd( );
6:              mmap(addr, boffset, size, fd);
7:          }
8:      }
9:      else
10:     {
11:         bp = bufgrab( );
12:         if( buffer is not mapped)
13:         {
14:             free_addr = grabVirtualAdd( );
15:             mmap(addr, boffset, size, fd);
16:         }
17:         bufread(bp);
18:     }
```

The advantages of this method of creating shmfs/tmpfs on the extended memory include that no copying is required, there is no context switch, and the solution provides a predictable performance. However, using shmfs/tmpfs on the extended memory with multiple addresses for a given page is both overly complex and costly in terms of resource usage, specifically the cost of unmap/map to shmfs and the large resource overhead. Issues with this method include that when a task switches from one engine to another, it needs to be ensured that there is a valid map before the page is accessed. For example, I/O completion routines should have access to a mapped address. Also, another consideration is a scenario in which there are no free virtual addresses.

With respect to resource overhead, each buffer pool (bp) needs to have N (number of engines) 32-bit values to store the virtual address, apart from one 64-bit value to store the offset and one N bit word to store the status. For example, with 8 engines, 8*4+8+1=41 bytes would be needed. It should be noted that this method may need N (number of engines) to be equal to the maximum number of engines that are possible, as engines can come offline and online dynamically. Additionally, the number of bps increases substantially and can reduce addressing a window of 2.7 G. For example, to maintain bps for 8 GB memory it may require 700 MB of data. For a 2K page size max it could be increased up to 16 GB, and for a 4K max it would be approximately 32 GB. To avoid this, a hierarchical data structure to maintain bps may be required, as well as maintaining a list of free virtual addresses. This can take 16 bytes per entry/per virtual address.

Extended Memory Support-shmfs as Secondary Storage (L2 Cache)

The approach of the present invention provides for utilizing a secondary cache as secondary storage (i.e., secondary or L2 cache). In the currently preferred embodiment, the secondary cache is implemented as a shared memory file system (shmfs). This approach of using shmfs as secondary storage strikes a balance between the method of using a statically mapped window, and the alternative method of creating shmfs/tmpfs on the extended memory with multiple addresses for a given page. The advantages of the methodology of the present invention include not incurring a context switch from engine to engine as with the statically mapped window method. The present invention also consumes less resources than the approach of using shmfs/tmpfs on the extended memory. Experience indicates that the methodology of the present invention for using shmfs as secondary storage provides improved performance compared to these other approaches. With shmfs as secondary storage the copying process can be optimized by limiting the copy to only 2 buffers. In terms of complexity this solution is also more modular and less complex to implement.

The secondary cache provided in accordance with the system and methodology of the present invention avoid disk input/output (I/O) operations when pages are found in the secondary cache. Configuring a large secondary cache is particularly useful in database implementations in which the primary cache is limited. For example, a Linux 32-bit OS platform is generally limited to an addressable range of 2.7 GB from the process (application) perspective. With a cache size of only 2.7 GB, a database application will frequently issue I/Os (i.e., input/output operations) on both raw devices and file system devices. However, with the extended cache provided in accordance with the present invention, the number of I/Os that are required are considerably less, thereby yielding better performance. With a benchmark of an OLTP (on-line transaction processing) workload with 50/50 read and write ratio, the current implementation of the present invention demonstrates a 200% improvement compared to raw devices, and 30% improvement compared to file system devices.

The advantages of using shmfs as secondary storage includes that it allows for optimal resource usage, that no context switch is required, and that it provides for predictable performance. More particularly, the methodology of the present invention consumes less resources than the approach of creating shmfs/tmpfs on the extended memory and avoids the context switch of the statically mapped window approach. Disadvantages of the methodology include the unmap/map operations and the fact that it may require up to three copies. In order to properly implement the methodology of the present invention for using shmfs as secondary storage, washing needs to be extended to the secondary cache, and checkpointing also has to take care of secondary cache. Additionally, writes of the secondary cache can be difficult and somewhat complex. It should be noted that the resource overhead, for an 8 GB segment of shared memory with a 2 k page size, for maintaining the LRU/MRU list associated with the secondary cache could cost approximately 128 MB. The following discussion will examine the methodology of the present invention in more detail, including how a miss in the primary cache is handled, and how other operations involving the secondary cache are performed.

Detailed Operation

The following description presents method steps that may be implemented using processor-executable instructions, for directing operation of a device under processor control. The computer-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Structure of Secondary Cache

The following discussion describes the currently preferred embodiment of the present invention which provides for utilizing shmfs (shared memory file system) as the secondary cache. However, the present invention can also be implemented in other environments. In an alternative embodiment, for instance, the secondary cache could be supported on external memory (e.g., a file server or the like). For example, the present invention can be implemented in a cluster environment. Portions of the extended memory could be supported on various machines in the cluster with the present invention providing a mapping mechanism so that the extended memory could be located anywhere in the cluster.

The system and methodology of the present invention provides an abstraction layer or API which enables an application to obtain pages from a secondary cache without having to know or be concerned about the actual location of data pages in the secondary cache. This abstraction also enables the secondary cache to be supported on various types of systems and devices. For instance, the abstract API provided by the present invention may enable data to be brought in from various different machines in a cluster. The abstraction layer provides for a maintaining a set of offsets which indicate that a particular page is at a particular offset. The system of the present invention underneath maps where the offset is and so forth, but from the standpoint of an application requesting a particular page this is completely abstracted. The offset to the physical memory of the data implementation is provided by the kernel services which in the currently preferred embodiment uses shared memory (i.e., the shmfs) and the memory mapped file interface to provide such an offset.

In the currently preferred embodiment on a hardware platform running the Linux operating system, shared memory will include the primary cache, and will have a data structure which includes a list pointing to pages in the secondary store (cache). A LRU/MRU (least recently used/most recently used) chain of offsets and the corresponding page it is holding is maintained. An example of an entry in this LRU/MRU list is as follows:

```
1:    struct sec_cache_entry
2:    {
3:        LINK ecache_link; /* to maintain LRU/MRU chain */
4:        long offset ; /* offset in the shmfs */
5:        short status; /* Needed for bookkeeping */
```

-continued

```
6:        pgid_t pageno; /* Page num */
7:        dbid_t dbid; /* dbid */
8:    };
```

The structure provides translation from the page to the offset. But that offset is not just a translation, it is also a mapping. The offset enables the system to go and find out the actual location of where a particular page where is stored. The abstraction layer provided by the present invention is illustrated as the above structure simply provides that a particular page (identified by page number or pageno at line 6) is at a given offset (as provided at line 4). The dbid at line 7 identifies the database. The LRU/MRU list entry can be around 32 bytes (1 cache line) per page in the secondary cache.

The secondary cache provided by the present invention also supports the specific transactional needs required in a database system. Only certain types of data are stored in the secondary cache provided by the present invention. An operating system cache, in contrast, is a very generic cache that does not have knowledge of the underlying data. The system of the present invention selectively determines the appropriate items to be brought into the cache based on the workload of the system. Generally, the secondary cache serves as a data cache for databases and brings in tables containing data, meta-data, indexes, and page chain information. Other items that are less useful to maintain in cache are excluded. For example, the log is not brought into the secondary cache. System catalogs are also typically not brought into the secondary cache.

In the currently preferred embodiment of the present invention, the criteria (or rules) for placing a page (buffer) in the secondary cache include the following:

The buffer does not contain a log page.

The buffer is not destroyed and is not in writing.

The buffer belongs to the lowest buffer pool (bmass_head=bmass_tail). This means it is of the lowest size of the pool and the pages are ones that get replaced.

The buffer does not have dbid=0. In other words the buffer does belong to a database.

The object id in the buffer is not 0 (i.e, it is a valid object).

The buffer is not a system object.

The buffer is not a SORT buffer.

The above are specific criteria that require knowledge of the workload to determine what to put into the cache (i.e., secondary cache). The system of the present invention uses this knowledge to avoid using secondary cache for objects that are not useful to maintain in cache. Unlike an operating system cache, which generally does not have any useful information on the workload, the present invention uses its knowledge of the workload to an advantage so that the items retained in cache are likely to be useful. The pages in the secondary cache are pages that have spilled over from the primary cache and are maintained in the cache on a MRU/LRU basis. This approach ensures that the secondary cache is populated with items that are likely to be needed.

Secondary Cache in Operation

Figure 5:
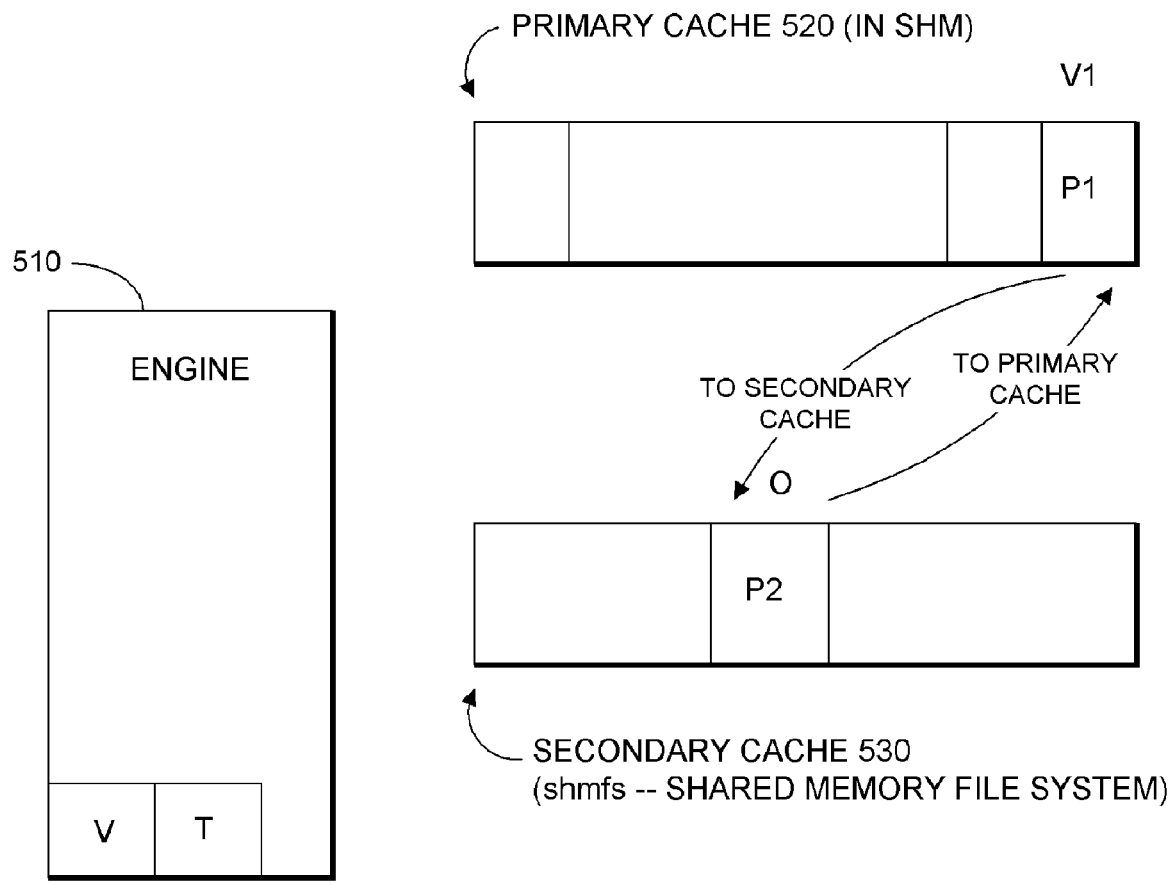
FIG. 5 is a block diagram illustrating at a high level how the secondary cache of the present invention may be used in operation.

FIG. 5 is a block diagram illustrating at a high level how the secondary cache of the present invention may be used in operation. As shown at FIG. 5, the primary cache 520 is in the shared memory (SHM), which is accessible by all of the engines, including the engine 510. The secondary cache 530 comprises secondary storage which in the presently preferred embodiment is implemented as a shared memory file system (shmfs). As also shown, a page P1 is in the primary cache 520 at address V1 and a page P2 is in the secondary cache 530 at offset O.

The following example illustrates how the secondary cache may be used in operation. Assume that page P2 is needed for a transaction that is being performed by the engine 510. If page P2 is not found in the primary cache 520, then methodology of the present invention provides for searching for page P2 in the secondary cache 530. This involves a search of an internal data structure that maintains offsets for pages in the secondary cache. If the page P2 is found during this search, the method proceeds to fetch the page P2 which is at the offset (i.e., offset O) indicated in the internal data structure. Page P2 is then swapped with page P1 in the primary cache. As a result, pages P1 and P2 are exchanged, with P1 going to the secondary cache 530 and P2 going to the primary cache 520. From the standpoint of the application, it does not need to be concerned about whether the requested page (i.e., page P2 in this example) is in the primary or secondary cache. The application simply requests the desired page (e.g., page P2) and the system handles the process of searching for the desired page and making it available.

The following illustrates the operations involved in a swapping the page P2 found in the secondary cache with page P1 in the primary cache:

1: mmap(V, O, fd); /* Map the offset O to virtual address V */;
2: memove(V1, T); /* Move the content of V1 (grabbed buffer) to T */;
3: memove(V, V1); /* Move the content of V (page P2) to V1 (grabbed buffer)*/;
4: memove(T, V); /* Move the page P1 in T to secondary space at offset O */; and
5: munmap(V, size); /* Unmap the V */.

As shown at line 1, the offset O is first mapped to the given virtual address V (a free virtual address). The content of V1 (grabbed buffer) is then moved to a temporary buffer T as illustrated at line 2. Next, the content of page P2 is moved to V1 (i.e., the grabbed buffer) as provided at line 3. In other words, page P2 is copied to V1 in the primary cache. After page P2 has been moved to the primary cache, page P1 can be moved to the secondary cache. As shown at line 4, page P1 in the temporary buffer T is moved into the secondary cache at offset O. At line 5, the virtual address is unmapped. At the point the swap is done and page P1 has been exchanged with page P2. It should be noted that the page P2 can be located anywhere and no assumption is made about the underlying device or location where it is stored. The page can simply be requested and the system of the present invention takes care of the necessary details in locating the page and making it available.

Reading from the Disk

Reading from disk occurs when data is not present in either the primary cache or the secondary cache. There are two types of reads, which are referred to as "cold reads", and "warm reads". Cold reads occur when the primary cache is not full. Warm reads occur when the primary cache is filled with pages. In the case of cold reads, there are free unused buffers in the primary cache. With warm reads there may or may not be a free buffer in the secondary cache, however, all the buffers in the primary cache are used.

Figure 6A:
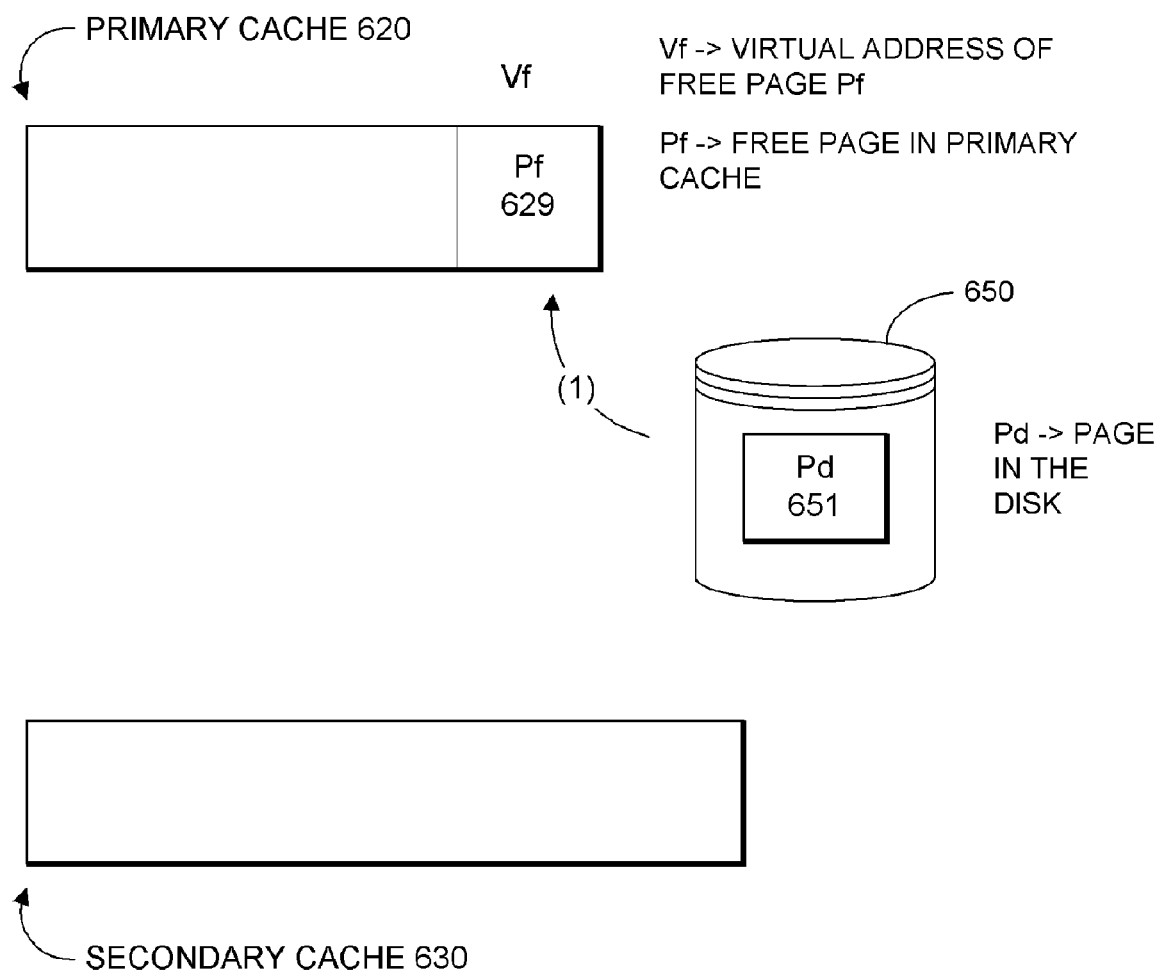
FIG. 6A is a block diagram illustrating the process of making a cold read from the disk.

FIG. 6A is a block diagram illustrating the process of making a cold read from the disk. A cold read occurs when there are free unused buffers in the primary cache. For example, assume that the database engine needs a page (page Pd) from a table or an index. First, the primary cache is searched (i.e., based on a particular page id and database id which serve to identify the desired page. In this case the page is not found in the primary cache. Accordingly, the secondary cache is then searched for the page. In this case, there is also a secondary cache miss as the page Pd is not in the secondary cache. Accordingly, the page Pd needs to be pulled in to the primary cache from the disk. As shown at FIG. 6A, the page Pd 651 can be read in from disk through a call to the operating system (O/S) services. In this case, the primary cache 620 is not full. Accordingly, a cold read can be performed with page Pd 651 read directly in to the primary cache 620. As shown at FIG. 6A, when a free buffer (Pf 629) is available in the primary cache 620, the disk page (Pd 651) can be read directly into the primary cache as illustrated at (1) without any operation being performed at the secondary cache 630.

Figure 6B:
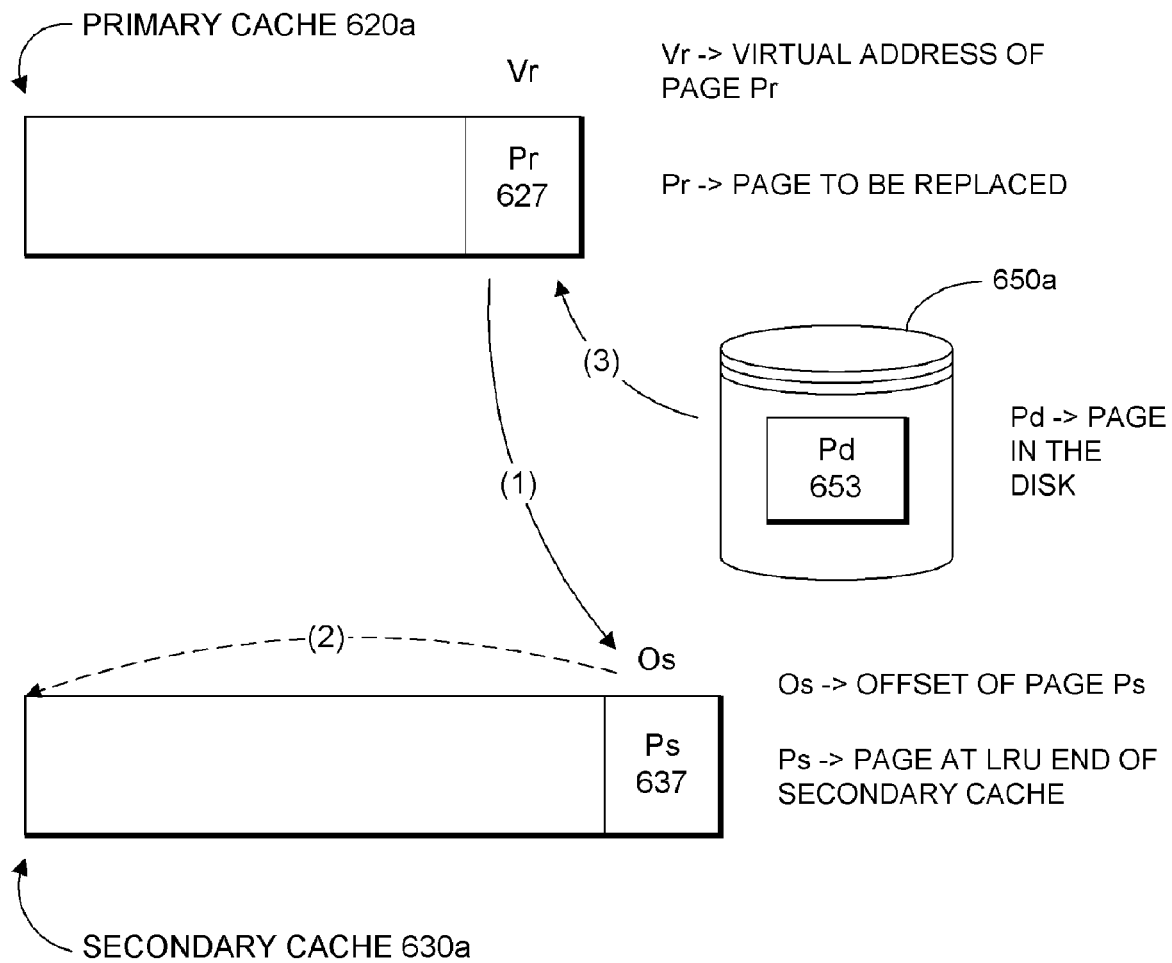
FIG. 6B is a block diagram illustrating the process of making a warm read from disk.

FIG. 6B is a block diagram illustrating the process of making a warm read from disk. This is the case when a page was not found in primary or secondary cache and the primary cache is full. As a result, before reading the page in from the disk to the primary cache, a page needs to be removed from the primary cache to make space for reading in a new page. As shown at FIG. 6B, a page Pd 653 is being read into the primary cache 620a from the disk 650a. A Least Recently Used (LRU) list that is maintained to indicate pages that have not been recently used is consulted to determine/select the page to be removed from the primary cache 620a. Based on this LRU list, a page Pr 627 in the primary cache is selected. The page Pr 627 is the page in the primary cache 620a that is being replaced by Pd 653. Page Pd 653 is to be copied to the memory location addressed at Vr (i.e., the location currently occupied by page Pr 627). Before this can occur, page Pr 627 from the primary cache 630a is moved into the secondary cache 630a at the offset Os where some (valid/free) page Ps 637 currently resides.

In the warm read from disk scenario illustrated at FIG. 6B, the following operations occur:

1: mmap(Vt, Os, fd); /* Map the temp virtual address Vt to offset Os */;
2: memove(Vr, Vt); /* Copy the content of Vr (page Pr) to Vt (overwrites Ps) */;
3: insert_MRU(Os); /* Insert Os (now that it has Pr) at the MRU end */;
4: munmap(Vt, size); /* unmap the temp address. We are done */;
5: read(Vr, Pd); /* Read the page Pd into address Vr */.

As shown at (1) at FIG. 6B, the above operation involves coping the page Pr from the primary cache to the secondary cache to create space in the primary cache. After this takes place, the offset Os of the new page in the secondary cache (Pr) is added to the MRU end of the list as shown at (2) at FIG. 6B. After space is cleared in the primary cache, the page Pd is read into the primary cache (i.e., from the disk) at (3) at FIG. 6B. The page Pd is read into the primary cache at the address Vr from which the page Pr was removed.

Figure 7:
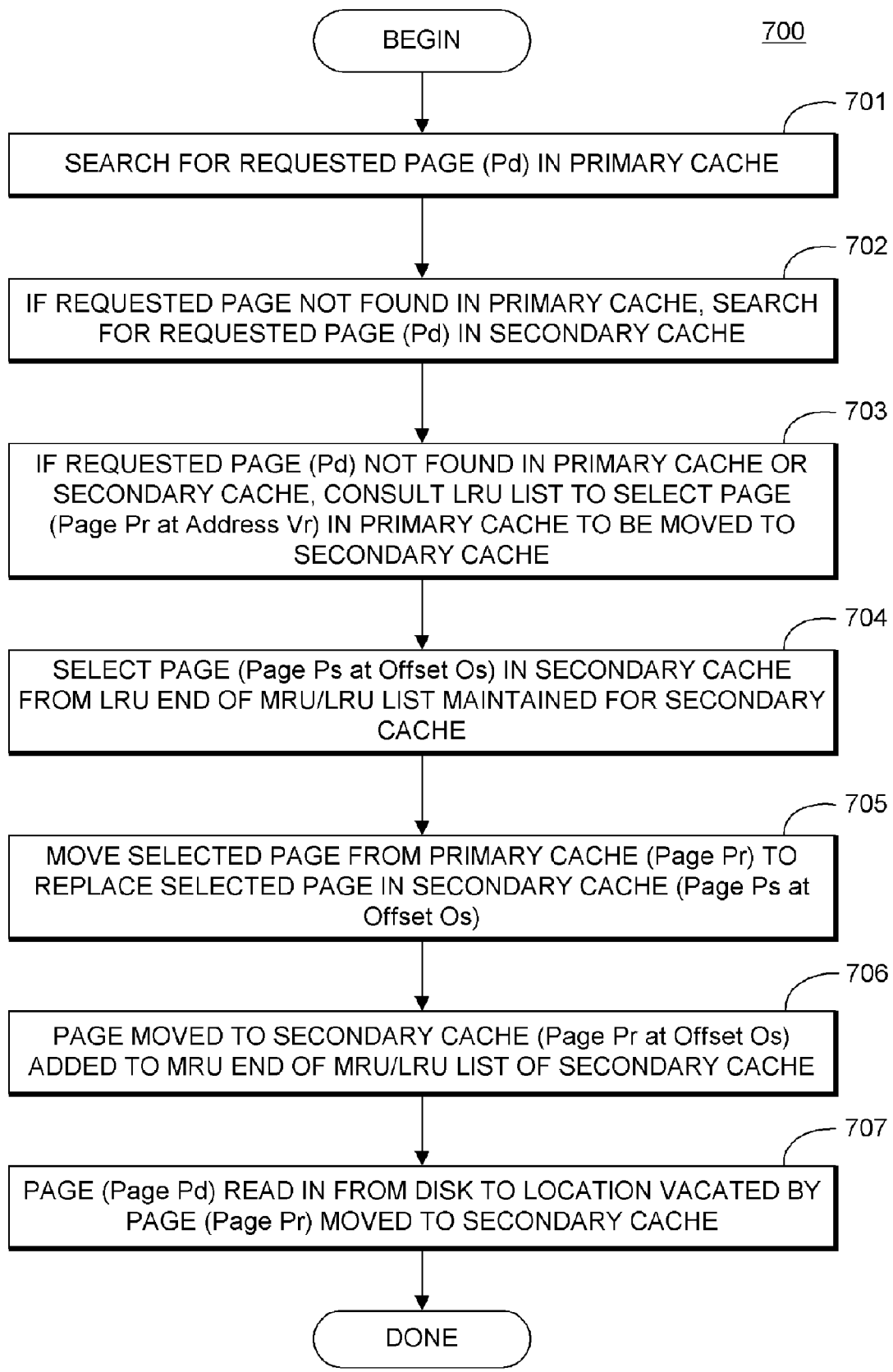
FIG. 7 is a flowchart illustrating the operations involved in making a warm read from the disk in further detail.

FIG. 7 is a flowchart 700 illustrating the operations involved in making a warm read from the disk in further detail. The context is that a particular page has been requested by the database engine. At step 701, a search for the requested page (page Pd to use the same example as above) is made in the primary cache. In this case, there is cache miss in the primary cache as page Pd is not found in the primary cache. If the requested page is not found in the primary cache, the secondary cache is searched at step 702. Generally, a lookup in the secondary cache is performed based on a page identifier and a database identifier for the particular page. In this example, there is also a secondary cache miss (i.e., the requested page Pd is not found in secondary cache). Accordingly, the page Pd must be read in from disk.

If primary cache was not full, the page could simply be read from disk to the primary cache (i.e., a "cold read") as described above. However, in this case the primary cache is full, so before reading in the page Pd from disk, room must be made in the primary cache for the page being pulled in from the disk. Rather than throwing out a page or writing it to disk, the methodology of the present invention provides for creating space in the primary cache by moving a page from the primary cache to the secondary cache.

At step 703, a least recently used (LRU) list that is maintained to indicate pages that have not be recently used is consulted to determine the page in the primary cache that is to be moved to the secondary cache. In this example, page Pr having an address Vr is selected from the primary cache. As described above, a MRU/LRU list is also maintained for the secondary cache. At step 704, a page in the secondary cache is selected from the LRU end of the MRU/LRU list maintained for the secondary cache. In this case, page Ps at offset Os is selected. This page may be either a free or valid page. For purposes of this example, assume that the page (i.e., page Ps at offset Os using this same example) is free as the secondary cache is not full. However, it should be noted that if the secondary cache is full and page Ps is valid, some additional steps may be necessary to write the page Ps from the secondary cache to disk before it is replaced in the secondary cache.

At step 705, the page (page Pr) is moved from the primary cache to the secondary cache at the location of the page Ps (i.e., at offset Os). At step 706, the page at offset Os is added to the MRU end of the MRU/LRU list maintained for the secondary cache.

After the page Pr has been moved to the secondary cache, page Pd is read in from the disk to the primary cache at step 707. Page Pd is placed in the location just vacated by page Pr at address Vr. It should be noted that only one copy is incurred in this scenario. Also note that page Ps in the secondary cache might be a valid page. In that case, page Ps gets replaced from the secondary cache. The methodology of the present invention provides that any replacement done at the secondary cache level ensures that the "dirty" (used) pages are written before they get replaced. This may involve some additional steps (not shown at FIG. 6B or at FIG. 7) which are described below.

Secondary Cache Hit

Figure 8:
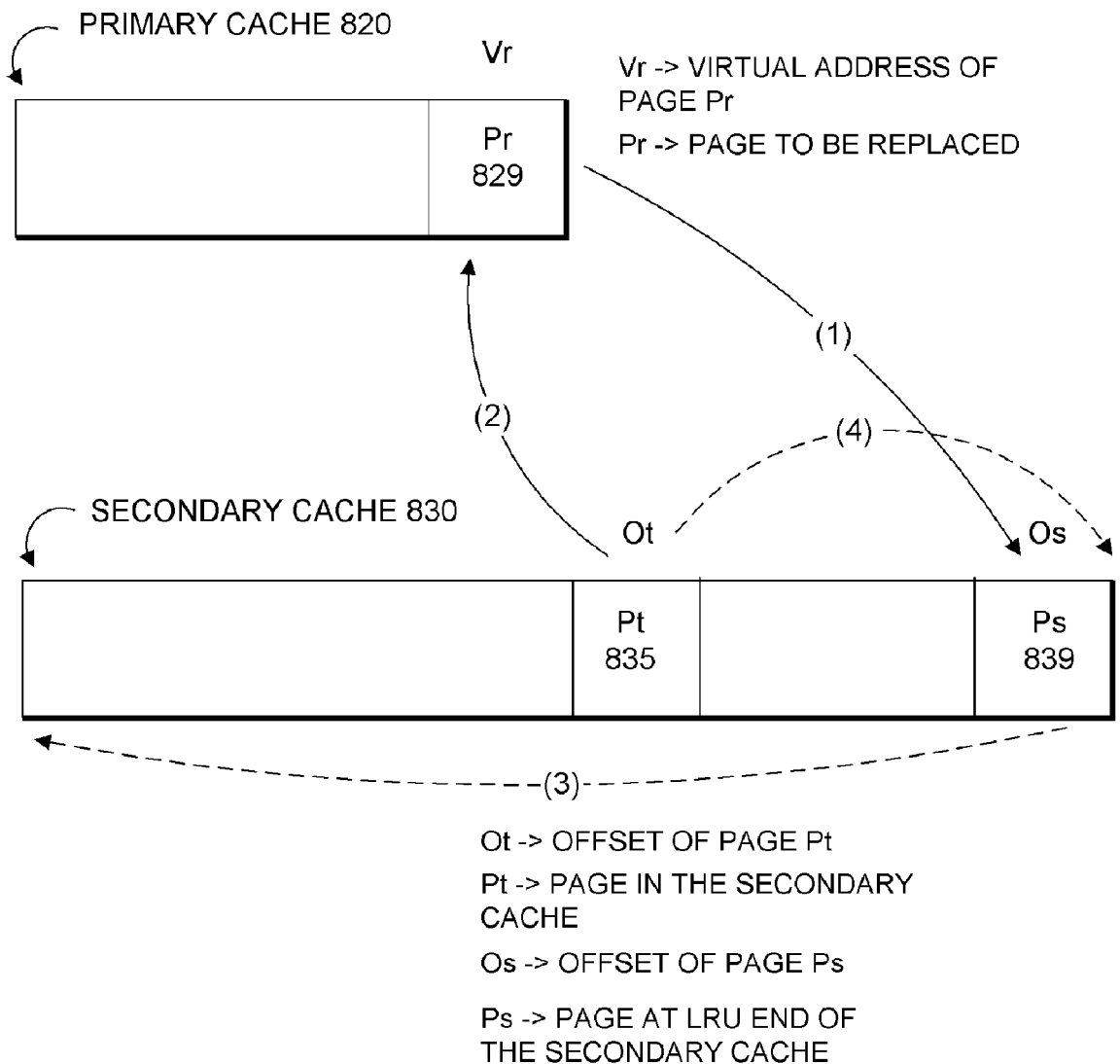
FIG. 8 is a block diagram illustrating a secondary cache hit.

FIG. 8 is a block diagram illustrating a secondary cache hit. In this case, a page Pt is requested. The primary cache 820 is searched, but it does not contain the desired page Pt. Accordingly, the secondary cache 830 is then searched. The requested page Pt 835 is found in the secondary cache 830 (i.e., a "secondary cache hit"). In order to bring the page Pt 835 in from the secondary cache 830, a page Pr 829 must first be moved out of the primary cache 820 in order to accommodate bringing in page Pt from the secondary cache 830. The page Pr 829 is moved into the secondary cache, replacing page Ps 839 (which is at the LRU end of the secondary cache 830). As shown at FIG. 8, page Pt 835 is the targeted page that is found in the secondary cache 830. As also shown, Ot is the offset of page Pt, Pr 829 is the page to be replaced from the primary cache 820, and Vr is the virtual address of page Pr. Also, page Ps 839 is the page at the LRU end of the secondary cache 830, and Os is the offset of page Ps.

The following are the operations that occur in moving the targeted page Pt in the secondary cache to the primary cache, corresponding to (1)-(4) illustrated at FIG. 8:

(1) mmap(Vtemp, Os, fd); /* Map the offset of LRU end of the page of the secondary cache */; memmove(Vr, Vtemp); /* Copy the content of replaced buffer into LRU buffer in secondary cache */;

(2) munmap(Vtemp, size); /* Unmap the temp address */; mmap(Vtemp, Ot, fd); /* Map Vt to the offset of the page Pt */; memmove(Vtemp, Vr); /* Copy the target page to Vr */;

(3) munmap(Vtemp, size); /* unmap the temp address. We are done */; insert_MRU(Os); /* Insert Os (now that it has Pr) at the MRU end */;

(4) linsert_LRU(Ot); /* Insert Ot (it is a free buffer) at the LRU end */; mark(Ot, DESTROYED); /* Mark the page at Ot destroyed or free */.

At (1), a page at the LRU end of the secondary cache is identified. The buffer containing this page is grabbed and the page Vr from the primary cache is moved to this address. Next, at (2), the page Pt is moved to the space in the primary cache vacated by page Pr. At (3), the offset Os is inserted at the MRU end of the secondary cache as the page Pr from the primary cache is now at this offset Os. At (4), the offset Ot (which is now a free buffer) is inserted at the LRU end of the secondary cache.

Figure 9A:
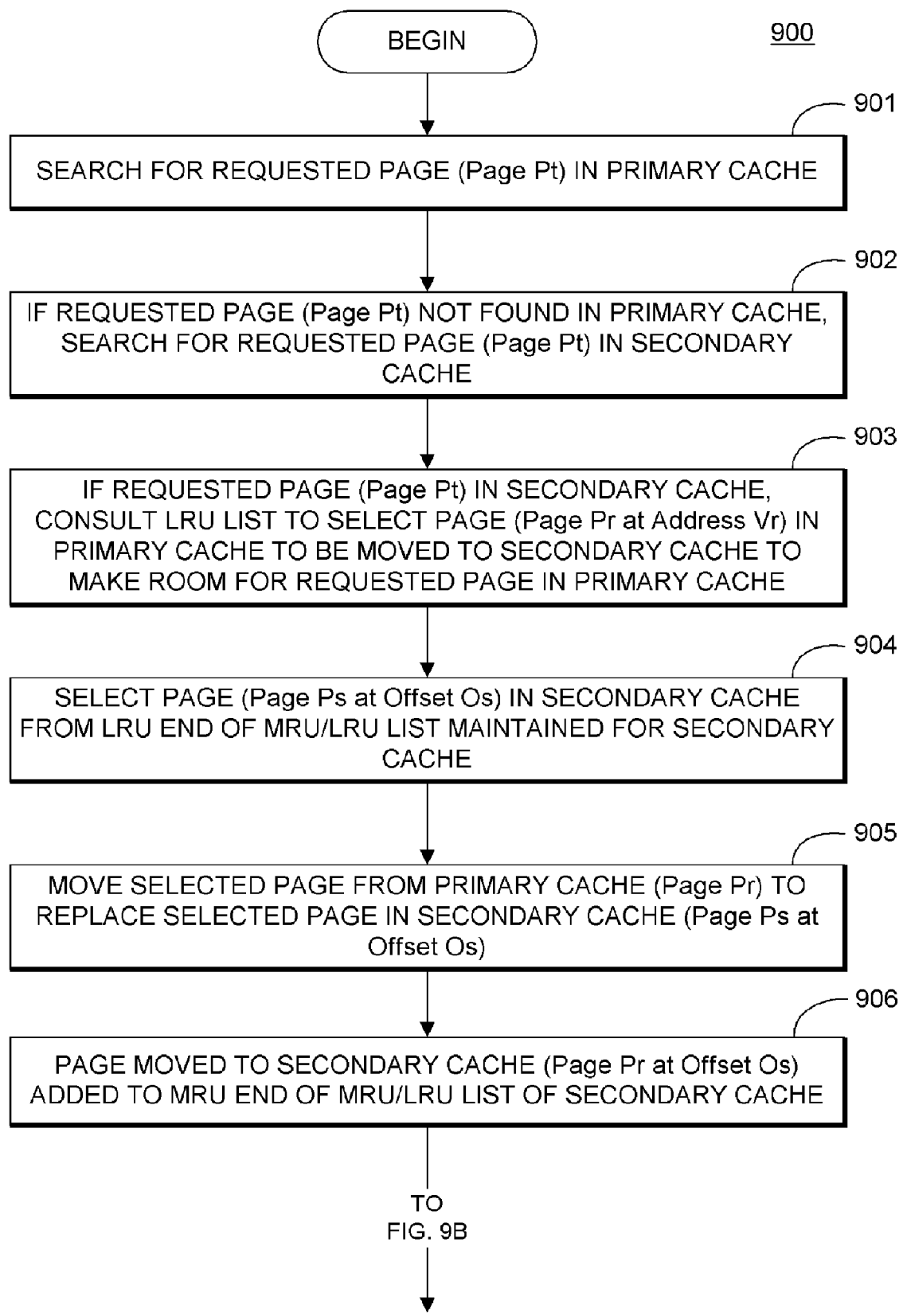
FIGS. 9A-B comprise a single flowchart illustrating the operations involved in replacing a page in the primary cache with a page from the secondary cache.
Figure 9B:
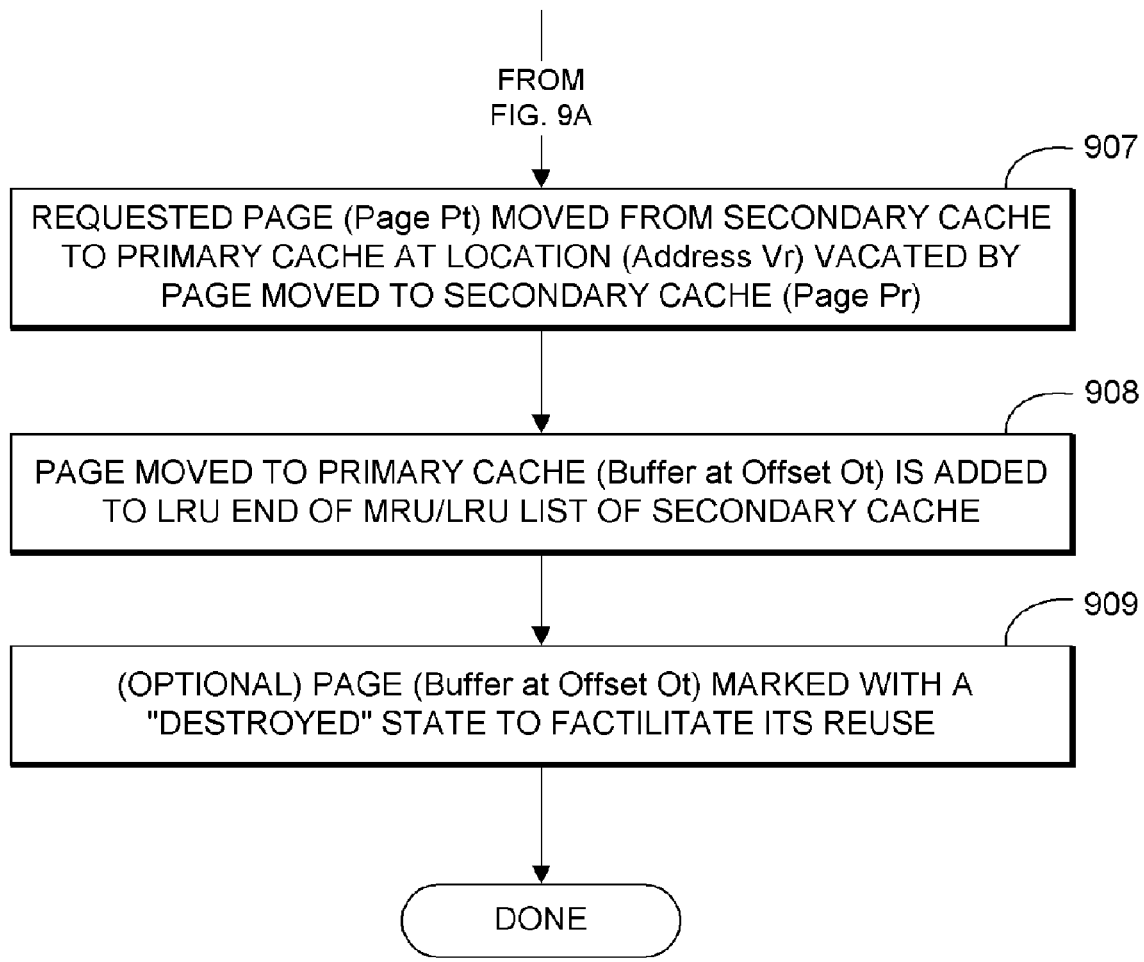

FIGS. 9A-B comprise a single flowchart 900 illustrating the operations involved in replacing a page in the primary cache with a page from the secondary cache in further detail. The context is that a particular page has been requested by the database engine. In response, a search for the requested page (page Pt to use the same example as above) is made in the primary cache at step 901. In this case, there is cache miss in the primary cache as page Pt is not found in the primary cache. If page Pt is not found in the primary cache, the secondary cache is searched at step 902 (e.g., based on a page identifier and a database identifier). In this case, page Pt is found in the secondary cache (a "secondary cache hit"). In order to bring this page Pt into the primary cache, a page must first be removed from the primary cache.

At step 903, a least recently used (LRU) list that is maintained to indicate pages that have not be recently used is consulted to select a page in the primary cache to be moved to the secondary cache. In this example, page Pr having an address Vr is selected from the primary cache. At step 904, a page in the secondary cache is selected from the LRU end of the MRU/LRU list maintained for the secondary cache. In this case, page Ps at offset Os is selected. This page may be either a free or valid page.

At step 905, the page (page Pr) is moved from the primary cache to the secondary cache at the location of the page Ps (i.e., at offset Os). At step 906, the page at offset Os (page Pr) is added to the MRU end of the MRU/LRU list maintained for the secondary cache. After the page Pr has been moved to the secondary cache, page Pt is moved from the secondary cache to the primary cache at step 907. Page Pt is moved to the location just vacated by page Pr at address Vr. At step 908, the page (buffer) at offset Ot is moved to the LRU end of the secondary cache's MRU/LRU list as this page has been moved to the primary cache. At (optional) step 909, this buffer (page) at offset Ot is marked with a "destroyed" state set to facilitate its reuse.

In this secondary cache hit scenario only two copies are incurred. However, a valid page from the secondary cache may have been thrown. Since this is the page at the LRU end of the secondary cache, it means that page may not have been used for a long time and the likelihood of it being accessed again is relatively low. At the end of the above operation there will be a buffer with the "destroyed" state set and this can be used in the subsequent replacement. Since every replacement is causing one destroyed buffer, valid pages are not often lost. Generally, a valid page will be lost only when a disk read kicks in and causes a buffer to be replaced from the primary cache to the secondary cache, the secondary cache becomes full, and there is a subsequent cache hit from the secondary cache. Then process for writing "dirty" (used) pages in the secondary cache to disk is described below.

Wash Region in Secondary Cache

The present invention, in its currently preferred embodiment, implements a washing mechanism in the secondary cache. The approach of the present invention is to avoid maintaining the wash region in the primary cache for the following reasons: (1) maintaining a wash region in the primary cache can generate a lot of writes because of the relatively small size of the primary cache; and (2) maintaining a wash region in the primary cache, rather than in the secondary cache, is similar to a file system buffer (i.e., write through and reads benefit from the file system cache). Performance degradation has been observed to result from the excessive writes caused by maintaining a wash in the primary cache. In an OLTP system writes are expensive when data is accessed in a random fashion. Also, the disk subsystem typically has a cache where it puts these write/read requests so that they can be processed efficiently. If the primary cache is flooded with a lot of writes this may adversely impact the responsiveness of the system.

The approach of the present invention is to delay data page writes as much as possible in the interest of improved system performance. One way in which this is achieved by the present invention is that when a page is moved from the primary cache to the secondary cache, the page is normally not then written out to disk. Data pages are aged to the secondary cache and are not written out to the disk as part of the normal aging. Instead, logs are written for tracking transactions, so that transactions/data pages can be recovered in the event of a system crash. As a result, the adverse performance impact of writing pages to disk is avoided in many cases. Also, there may be additional changes to the page, sometimes even before the end of a transaction, that can be made while a page is still in cache. Additional operations to read the page back in from disk are therefore also avoided. The approach of the present invention is to defer writes as long as possible (e.g., even after a transaction has been committed) and to maintain log records to guard against data loss. Any modification done to the data pages can be delayed as long as the log record associated with the modification has been written to the disk.

The present invention includes wash mechanisms for writing changes to data pages to disk when the system is at a "checkpoint". A checkpoint is a point in time where the changes are written to disk which can be initiated in several ways. The checkpoint can be issued by a user (e.g., system administrator). The checkpoint can also be issued based on certain operations occurring in the database (e.g., operations that require flushing all of the pages to disk). The system includes a checkpoint process which runs internally without the user having to initiate it.

Figure 10:
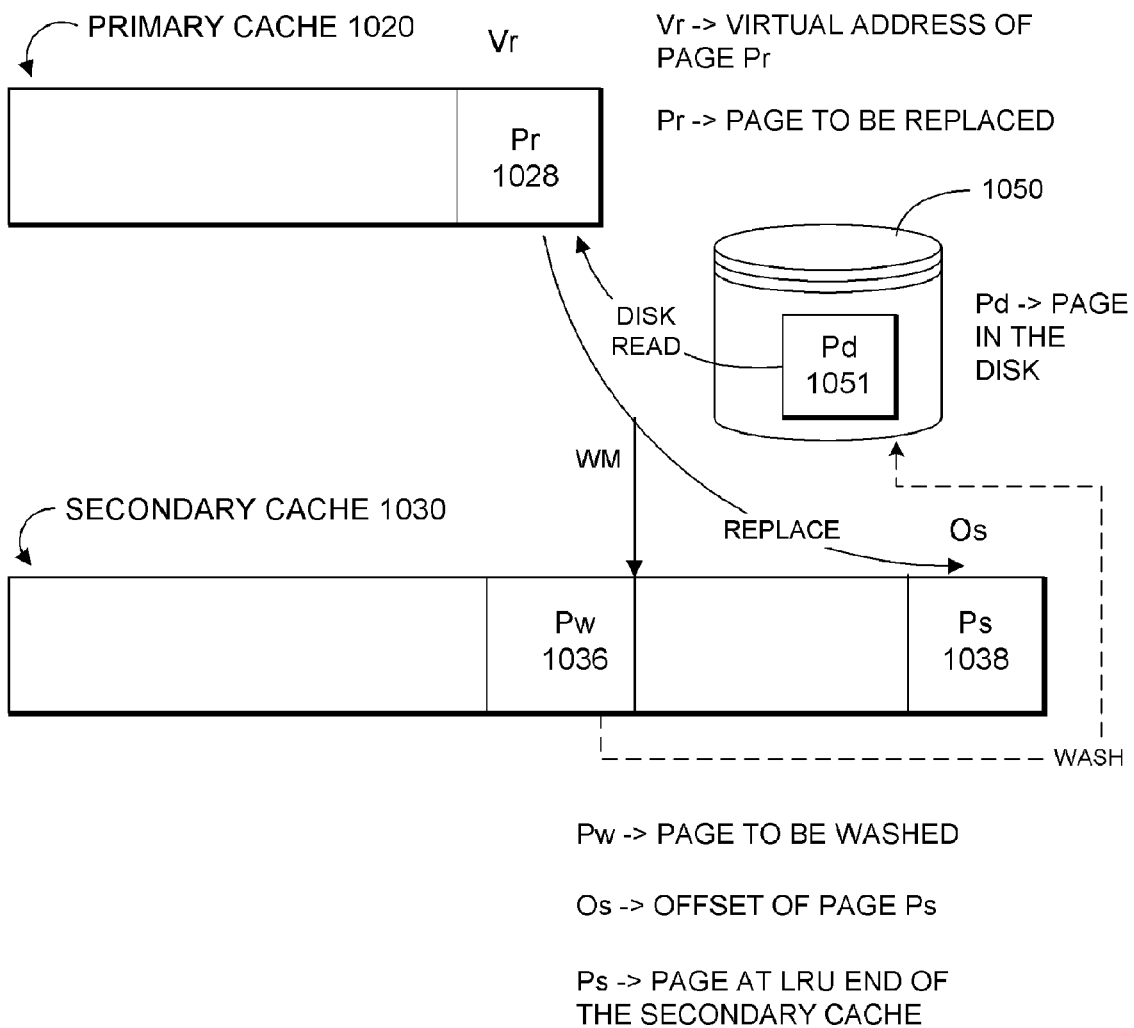
FIG. 10 is a block diagram illustrating the methodology of the current invention for implementing a washing mechanism in the secondary cache.

FIG. 10 is a block diagram illustrating the methodology of the current invention for implementing a washing mechanism in the secondary cache. In the currently preferred embodiment of the present invention the washing mechanism is implemented in the secondary cache 1030 as part of servicing a replacement request from the primary cache 1020 while reading a page from the disk 1050. In this situation a page is grabbed from the LRU end of the secondary cache 1030 to replace the page from the primary cache.

As shown at FIG. 10, page Pd 1051 is going to be read into the shared memory address Vr from the disk 1050. However, before reading the page from disk, a page location needs to be found in the secondary cache for moving the page Pr 1028. As described above, the system of the present invention will grab a page Ps 1038 from the LRU end of the secondary cache 1030. When grabbing the buffer page Pw 1036 will go past the wash marker (WM) and a write needs to be issued on this page Pw 1036. Note that in the case of a cache hit in the secondary cache, it is unlikely that any washing will need to be done because of the fact that the system grabs a buffer from the LRU end and inserts a destroyed buffer at the LRU end. In this fashion the system does not cause any buffers to move past the wash marker.

Dirty Buffers

One concern with maintaining the wash region in the secondary cache is the issue of a heterogeneous dirty buffer list (i.e., a dirty buffer list that contains some buffers that are in the primary cache and some buffers that are in the secondary cache). The system needs to be able to distinguish and manage these buffers together in the same list. With wash regions in the secondary cache, checkpoint performance may also be affected. This is because some of the dirty buffers are in the secondary cache, and to issue writes on these buffers the system has to map the offset and then issue a write. What is needed is a list of virtual addresses to issue the writes, and to wait until all the writes issued are complete so that the system can reuse the virtual addresses. The system of the present invention addresses these and other concerns, as will be discussed below.

There are two approaches to solve the problem of dirty buffers. The first approach provides for maintaining one dirty buffer link at the object level and having the same buffer header for both the primary and the secondary buffers. The following are the consequences of this approach: (1) each secondary buffer header size will be 128 bytes; (2) a status in the header will be required to state whether it is in the primary or secondary cache; and (3) whenever the dirty chain is accessed the system will need to make sure that it is addressable. This approach consumes a lot more resources and makes it complex to access buffers in the dirty chain.

The second and preferred approach is to maintain two different dirty link buffers; one for the buffers in the primary cache and one for the buffers in the secondary cache. This preferred approach used by the system of the present invention consumes less resources and makes it easier to access the primary and secondary buffers. The consequences of this approach include that the dirty buffers are not in the same chain, and checkpoint performance has to work on two different chains to issue writes. Also, inserting into the secondary chain is not as simple as inserting into the primary cache. The insertion operation has to find a proper insertion point based on the dirty sequence number, in case the dirty sequence number needs to be maintained in the ascending order. Otherwise, the checkpoint may have to issue writes on all of the buffers to ensure the recoverability.

Data Structures and Resource Overhead

With the system of the present invention the following information is needed in the server shared memory: a LRU/MRU chain of pages in the secondary cache, and one or several virtual address block(s) with the size of max buffer size. Currently, each entry in the LRU/MRU chain includes the following information:

```
1:  struct ecache_buf {
2:      LINK buf_link; /* Link for LRU/MRU chain */
3:      LINK hashtab_link; /* Link Structure for Has table
*/
4:      LINK dirty_chain; /* To maintain dirty chain */
5:      struct sec_cache_entry bxls_next;
```

-continued

```
6:    /* next buffer in the pinned chain */
7:       dbid_t bdbid; /* database id */
8:       pgid_t blpageno; /* logical page number */
9:       pgid_t bvirtpg; /* virtual page number */
10:      uint32 offset; /* Offset in the shmfs */
11:      short status; /* status of the buffer */
12:      circ_long dirtyseq; /* dirty sec for buffer */
13:      circ_long pinnedseq; /* pinned seq number */
14:   }
```

Maintaining this chain currently uses a maximum of 64 bytes per buffer in the secondary cache. For example, in an 8 GB memory with 6 GB of shmfs and page size of 4K, 256 MB of shared memory space may be needed to maintain this chain. Note that "offset" is a multiple of MIN(database page size, 2K). For example, if the database page size is 2K, then offset points to location=offset*2 k. If the database page size is 4K then it points to location=offset*4 k. The system thereby only needs a 32-bit integer to store the offsets more than 4 GB. On Linux, offsets have to be a multiple of 4K, which is the page size of the server. When a virtual address is mapped to a given offset, the 4K base for a given offset needs to be determined. This is only true for a 2K-database page size. For database page size >=4K, an offset can be directly used to map it to a virtual address. With the 2K page size the following needs to be done: 2 k_offset=offset<<10; 4 k_offset=offset & 0xffffeeff (which is 10th bit being zeroed).

After mapping the offset to a virtual address an additional 2K may need to be added to the virtual address before accessing it in case it does not align on a 4K boundary. All the information related to a dirty primary buffer is stored in the secondary buffer, so that when a page is read from the secondary buffer the dirty buffer can be reconstructed to maintain the consistency of the semantics.

Configuration

There are two alternative configuration options for implementation of the secondary cache. The first option is to allow each named cache to have an extended secondary cache of a specific size. The second option, which is used in the currently preferred embodiment of the present invention, is to have one global secondary cache which all the named caches share.

In an implementation in which there is a secondary cache for each named cache, a secondary cache of a specific size is allocated for each of the named caches. A typical configuration would look like the following:
1: [Named Cache:c_stock]
2: cache size=580M
3: cache status=mixed cache
4: cache replacement policy=DEFAULT
5: extended cache size=2 G An additional refinement to the above approach is to allow a specific pool to have extended cache configured as shown:
1: [Named Cache:c_stock]
2: cache size=580M
3: cache status=mixed cache
4: cache replacement policy=DEFAULT
5: extended cache size=2 G\
6: [4K I/O buffer Pool]
7: pool size=84M
8: wash size=4000 K
9: local async prefetch limit=DEFAULT
10: extended pool size=1 G The advantages of allowing each named cache to have an extended secondary cache of a specific size are that it is in sync with the primary cache configuration and fine-tuning is possible. The disadvantages are that the system will need to maintain multiple LRU/MRU chains, there are more configuration parameters, and there is additional complexity in the code to allow configuration/reconfiguration, and to maintain these pools.

The alternative and preferred option provides for using one global secondary cache, with all of the caches using this global secondary cache to replace their primary buffers. A typical configuration would look like the following:
1: [Cache Manager]
2: number of oam trips=DEFAULT
3: number of index trips=DEFAULT
4: memory alignment boundary=DEFAULT
5: global async prefetch limit=DEFAULT
6: global cache partition number=4
7: extended cache size=4784993

The advantages of using one global secondary cache are that this approach provides a simple configuration and there is less complexity in the code. Issues that need to be considered include that contention may increase as the memory size increases to cache more data, and there is no fine-tuning. This is the preferred embodiment because of its simplicity and ease of implementation.

Data Page Writes

The present invention provides for reads to directly happen to the pages in the primary cache. Also, bufawrites() or bufwrites() that are initiated by the access level occur as is because at the time these writes are initiated at the access level the page is already in the primary cache. Writes occur at the secondary cache during washing and at checkpointing. To implement the wash in the secondary cache, the wash marker needs to be maintained in the secondary cache. For the checkpointing operation there is a walk through the dirty chain of secondary buffers maintained in the DES. For issuing writes the offset is mapped to a free virtual address and then issues the writes on that engine. Since the write completion gets services on the same engine where the writes were issued, virtual address mapping will still be valid when serving the write completion.

List of Free Virtual Address

Figure 11:
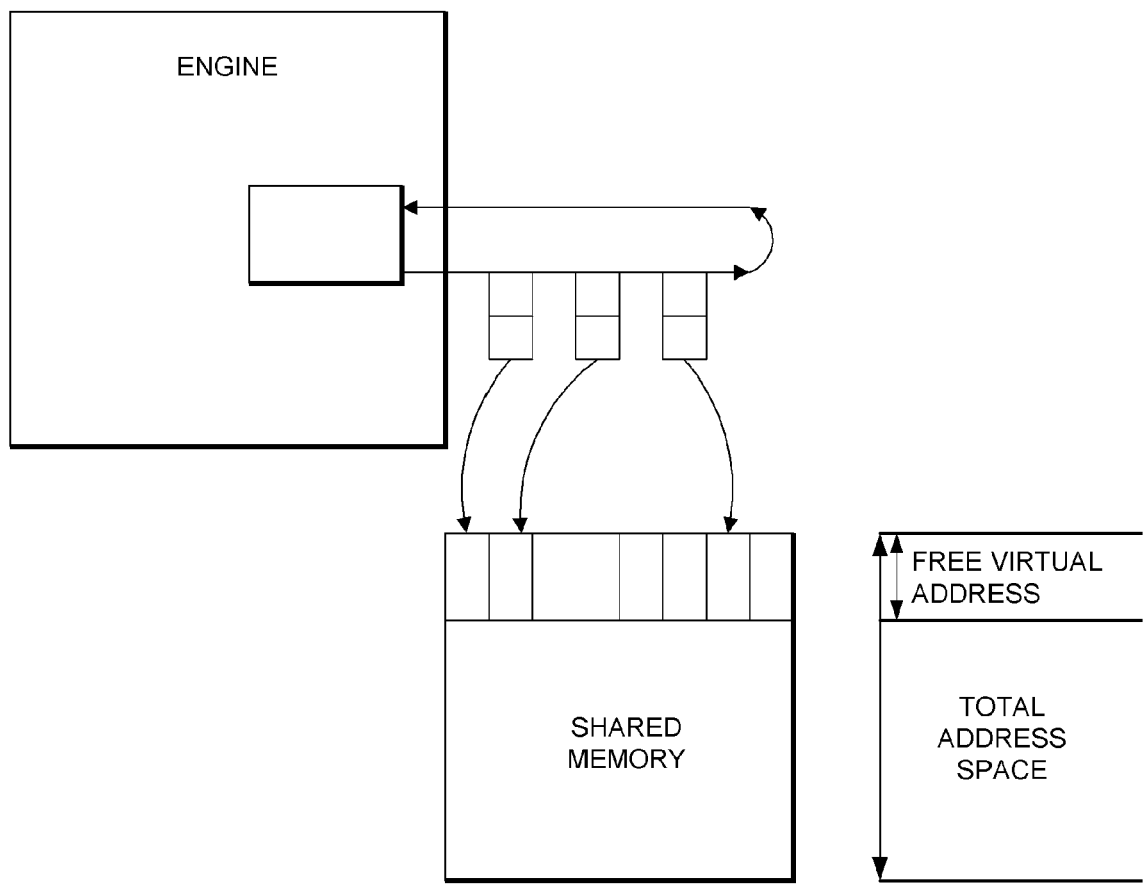
FIG. 11 is a block diagram illustrating the mapping of free virtual addresses.

FIG. 11 is a block diagram illustrating the mapping of free virtual addresses. For mapping purposes there needs to be a list of free virtual addresses. Virtual addresses are needed in operations in which there is a replacement from the primary cache to the secondary cache, and when writes need to be issued on a buffer in the secondary cache. For writes during washing only one page of virtual address space may be needed. However, the same virtual address cannot be reused until it is freed by the write completion routine. Also, during checkpoint multiple writes are issued. A linked list can be used in which virtual addresses are removed from the head of the linked list when a virtual address space is needed. The virtual addresses can then be inserted at the tail of the list after use. This linked list is maintained at the engine structure as shown at FIG. 11.

Kernel Services

In the current embodiment of the present invention the buffer manager and kernel services are separated to an extent so that any other alternative to shmfs can be used to provide the extended memory capability. The separation of the buffer manager and the kernel services enables adoption of different platforms without having to rewrite the buffer manager part of the system. There are two specific initialization modules: one module is initialized while the server is booting, and the other module is initialized while the engines come online. The database system kernel (e.g., ASE kernel) provides the following services and operations for extended memory support: (1) creating a new shared memory file; (2) deleting the shared memory file; (3) initializing the newly created shared memory file; (4) initializing the shmfs and server data structures such that initialization occurs during server boot and during engine onlining; (5) creating and maintaining a free list of virtual addresses; (6) writing a given page to a specific offset; and (7) reading from a given offset to a specific page.

There are three new kernel data structures introduced for bookkeeping operations at the kernel level. The first is as follows:

KECACHE_DESC

```
1:    struct kecache_desc {
2:        SHMID shmfsdesc; /* Shared memory file descriptor */
3:        size_t ospagesize; /* shfms page size */
4:    }
```

The above kernel data structure holds global information at the kernel level on the shmfs. SHMID, used in this structure, is an existing structure which contains all the fields necessary to store the filename, name size, flags, and the like. All the engines to open the shared memory file system file will use this structure. The first engine, which creates the shared memory file, will populate this kernel data structure with all the necessary information.

A second kernel data structure is as follows:

KE_ECACHE_DESC

```
1:    struct ke_ecache_desc {
2:        int shfsfd; /* File descriptor for the shfs file */
3:        LINK virtaddrlist; /* List of virtual addresses */
4:    }
```

The second kernel data structure is engine specific. It contains a file descriptor, which was obtained by opening the file on that engine. This structure also points to a list of virtual addresses that are available for mapping on this engine.

The third kernel data structure is as follows:

VIRT_ADDR_DESC

```
1:    struct virt_addr_desc {
2:        LINK virt_next; /* Next in the list */
3:        uint32 virt_addr; /* Virtual address */
4:        long offset; /* Offset in the file where this
5:        ** address is mapped to */
6:    }
```

This third kernel data structure contains the virtual address that is available or mapped to a specific offset to the shmfs file. If the offset is "−1" then the virtual address is not mapped to any offset. This will be tracked at the engine level through the linked list. The linked list can be implemented as a single linked list. The system ensures that used virtual addresses are kept at the head of the list and free addresses are kept at the tail of the list.

The following are the kernel structures which are enhanced to keep the secondary cache information structure:

KERNEL

```
1:    {
2:    #if defined(linux)
3:        int kiruntime_abi; /* for ABI run-time settings */
4:    #endif /* linux */
5:    #if LMS
6:        struct kecache_desc *kecache_desc;
7:    /* Secondary Cache descriptor */
8:    #endif /* LMS */
9:
10:   }
```

The above "KERNEL" structure has a handle to the secondary cache kernel descriptor. It should be noted that it is localized to the platform where the extended memory feature of the present invention is supported.

The following "ENGINE" structure is also maintained:

ENGINE

```
1:    {
2:        THREAD_KEY_T enthrdkey; /* key for thread local
3:            storage */
4:    #if LMS
5:        KE_ECACHE_DESC *e_ecache_desc; /* handle to secondary cache
6:            descriptor */
7:    #endif /* LMS*/
8:    }
```

The ENGINE structure includes a handle to the secondary cache structure specific to the engine where it stores the file descriptor, the list of virtual addresses, and the like.

Secondary Cache Operations

In the currently preferred embodiment of the present invention, the operations pertaining to the secondary cache are added in the Linux 32-bit platform directory. The two new files added are "ecachemgr.c" and "ecachemgr.h". These files are compiled as part of "libsrvmanager.a". The function calls from the generic code are encapsulated in the form of macros. These macros are defined to be non-operational (no-ops) in other platforms. The changes to the generic code are done in the following functions: (1) cm_init_pool_config: the bsearch_wash and wash_size is setup for extended memory support (LMS); (2) cm_calculate_washvalues: the change is done so that the default wash calculations are not performed for LMS (to affect the lowest sized buffer pool); and (3) cm_wash_mass_lru: instead of calling bufawrite call the macro ECACHE_REPLACE_BUF. The code to set MASS_WET is moved down since it gets reset as a part of bwfinish, which will not be called once the secondary cache is setup.

Wash Region in Primary

When the extended memory support (LMS) feature of the present invention is enabled, the wash region for the lowest buffer pool (which has the same size as the server page size) in all primary data caches is set to the minimum wash size (i.e., WASH_LOW_WATER). The user specified wash region is ignored. This is done as a part of the buffer pool initialization at startup. During run-time, the wash size of a buffer pool can be modified when the stored procedure sp_poolconfig is executed. In such scenarios, the wash size is maintained as required by LMS during the wash size calculations. Currently, when a buffer is grabbed from the LRU-MRU chain, a wash is issued (i.e., moves a mass which is just before the wash marker towards the LRU end after issuing a write). This behavior is altered, and now during a wash the mass is replaced in the secondary cache instead of issuing a write operation from the primary cache.

Replace Operation

The replace operation occurs when the primary cache manager spinlock is held in cm_wash_mass_lru(). When the buffer is to be replaced in the secondary cache, the following sequence of steps needs to be performed to maintain the consistency of the modified page: (1) set MASS_WRITING in the buffer status so that it is not grabbed; (2) grab a secondary buffer header, copy the required fields from the primary buffer to the secondary buffer, hash the buffer in the secondary hashtable, and set MASS_READING in the secondary buffer header; (3) drop all spinlocks and copy the page to the secondary cache; (4) if the page is successfully copied and the buffer is not kept then the buffer can be unhashed from the primary cache and MASS_WRITING reset; and (5) in case of any error, the buffer is unhashed from the secondary cache and will be washed as usual from the primary cache. It is important to note that at any point the buffer is hashed in either the primary cache or the secondary cache. All searchers will search the primary cache first. While the page is in the process of being copied to the secondary cache, the MASS_READING bit in the secondary buffer header will make the searchers wait for the copying operation to be completed. The hashing is done in the secondary cache holding the primary spinlock to ensure that no other copy of the page is brought into memory.

Figure 12:
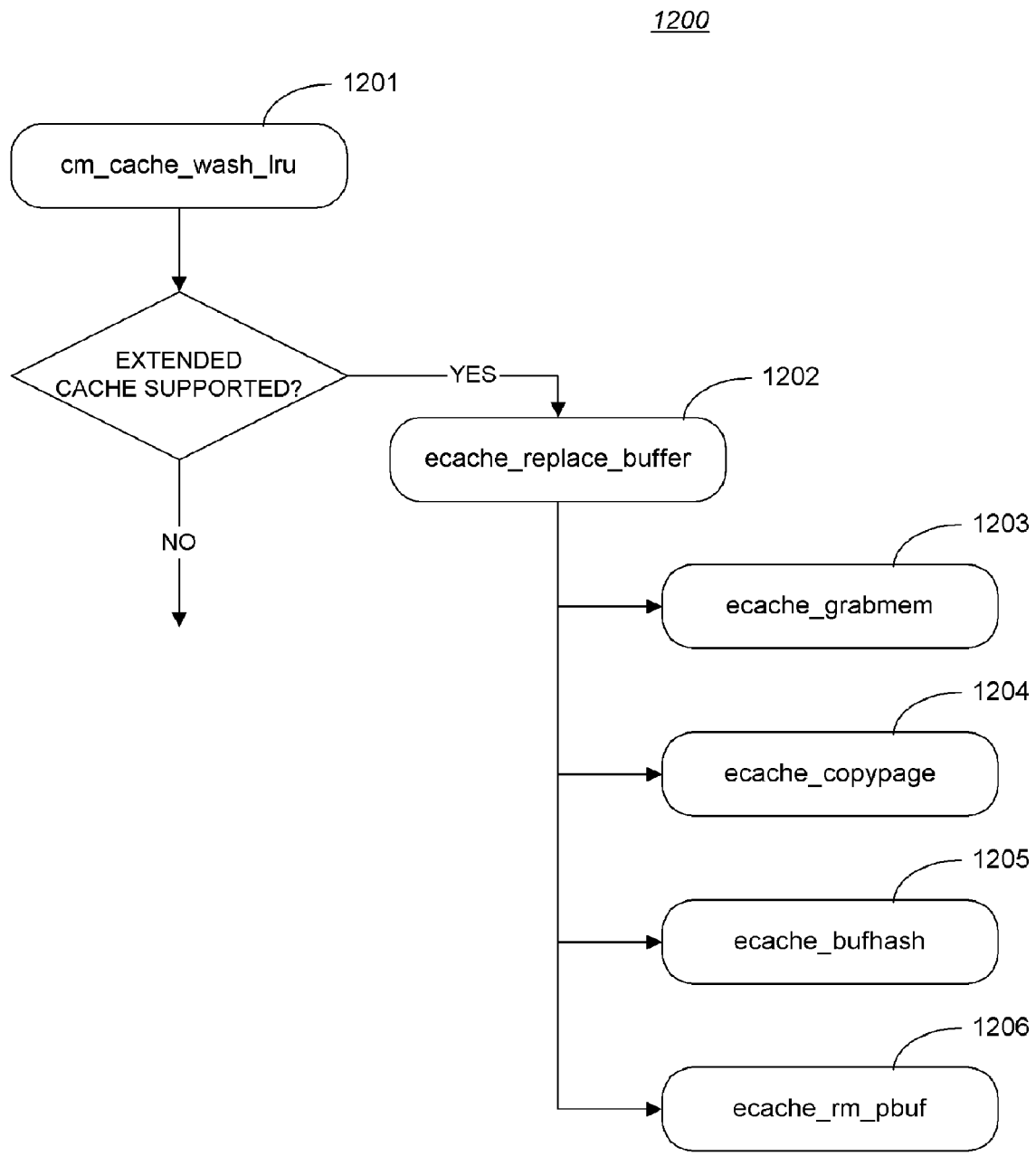
FIG. 12 is a high-level flow diagram illustrating the performance of a replace operation in the secondary cache.

FIG. 12 is a high-level flow diagram 1200 illustrating the performance of a replace operation in the secondary cache. The replace operation is performed in conjunction with a page "spilling over" from the primary cache to the secondary cache. As shown at FIG. 12, a cm_cache_wash_lru routine 1201 is called when a page is being replaced from the primary cache. If the secondary cache (extended cache) is supported, then a call is made to ecache_replacebuf 1202 to replace a buffer in the secondary cache if the extended cache is supported and the conditions previously discussed are met.

As also shown at FIG. 12, ecache_replacebuf 1202 does the following. First, it grabs a free buffer from the secondary cache by calling ecache___grabmem 1203. Next, it copies the page from the primary cache to the secondary buffer by calling ecache_copy_page 1204. Note that the abstraction provided by the present invention is illustrated by the call made to ecache_copypage 1204 which provides for copying to a location identified by an offset. The location itself can be anywhere (e.g., supported on various devices). The secondary buffer is then hashed for the secondary cache through the call to ecache_bufhash 1205. As the contents of the primary buffer have been copied, the primary buffer is no longer valid and can be removed. The call to ecache_rm_pbuf 1206 erases the identity of the primary buffer from the primary cache. The new buffer is then moved to the MRU side of the LRU/MRU chain of the secondary cache. This concludes a basic replacement operation.

Secondary Cache Read Operation

A secondary cache read operation is when a page is moved from the secondary cache into the primary cache. Reading from the secondary cache takes place as part of the bufread() call from the buffer manager. The bufread() call, which would normally read from the disk (i.e., in the absence of the secondary cache of the present invention), is intercepted. The secondary cache is checked to see if the requested buffer is present in the secondary cache. If the requested buffer is present in the secondary cache, the content of the secondary buffer is copied into the primary buffer and returned back to the buffer manager, as a disk I/O is completed. This is done transparently so that the buffer manager does not have to be aware of the extended cache's existence.

Figure 13:
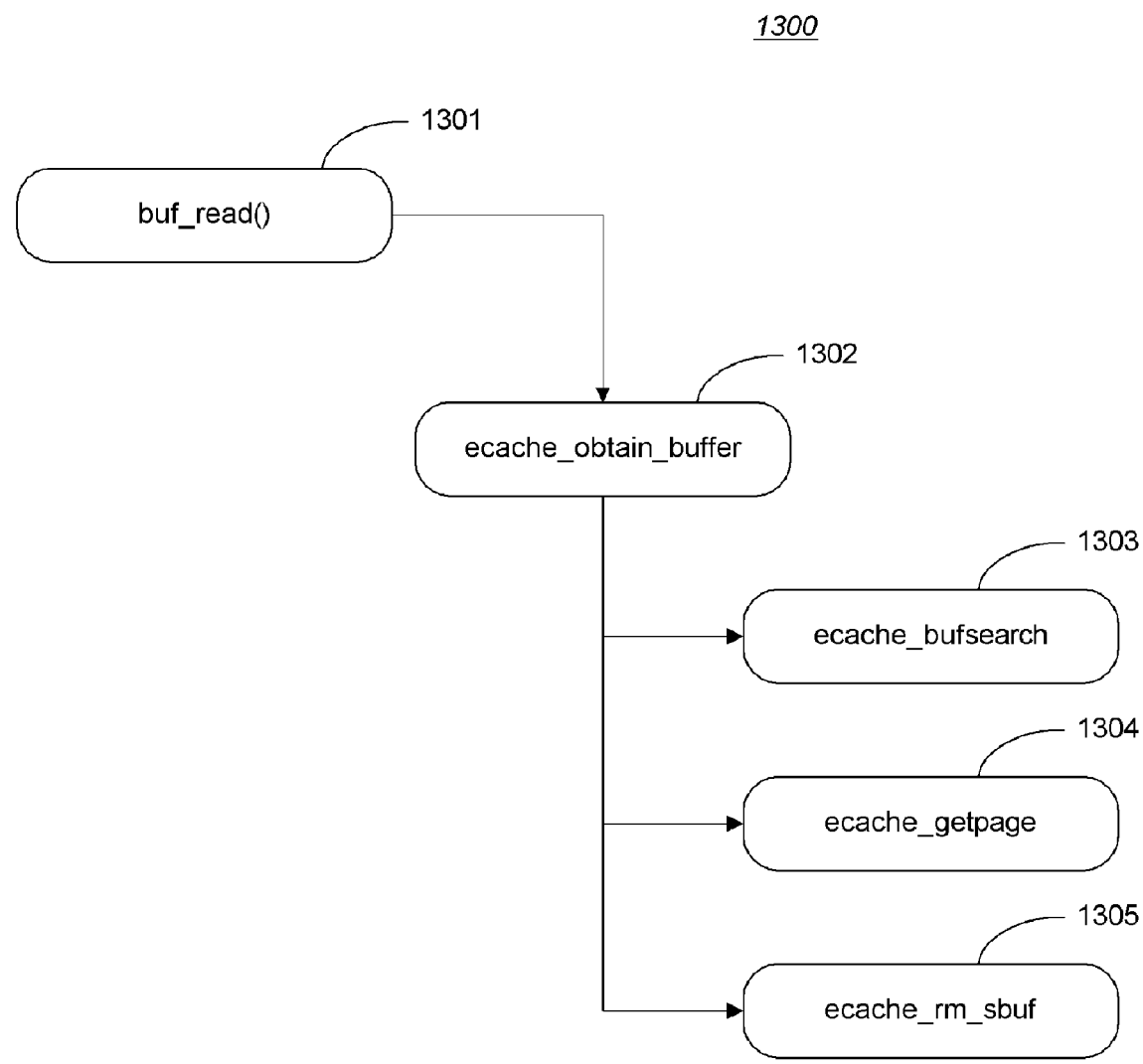
FIG. 13 is a flow diagram illustrating the performance of a read operation from the extended cache.

FIG. 13 is a flow diagram 1300 illustrating the performance of a read operation from the secondary (extended) cache. In this situation if the extended (secondary) cache is supported the call to read a page from the disk (buff_read() 1301) is intercepted. As shown at FIG. 13, bufread() 1301 calls ecache_obtain_buffer 1302 which is the workhorse routine for reading from the extended cache. The ecache_obtain_buffer routine 1302 performs the following operations. First, a buffer search is performed in the secondary cache to look for the requested page via a call to ecache_bufsearch 1303. If the search fails, this indicates that the page is not in the secondary cache and needs to be read in from the disk. However, if the requested page is present in the secondary cache then ecache_getpage 1304 is called to copy the content of the secondary buffer to the primary buffer. This is an abstraction to indicate that a buffer at a certain offset was found. The page is then brought in based on the offset that was found. In other words, the page is read in from wherever it may be located. After the copy operation the identity of the secondary buffer is destroyed from the secondary cache by calling ecache_rm_sbuf 1305.

Pseudocode

The following pseudocode provides further detail regarding the system and methodology of the present invention for providing extended memory support.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for extended memory support in a database system having a primary cache for storing database pages, the method comprising:

using a memory mapped file, creating a secondary cache in system memory available to the database system;

mapping a virtual address range to at least a portion of the secondary cache;

when the primary cache is full, replacing database pages from the primary cache using the secondary cache;

in response to a request for a particular database page, searching for the database particular page in the secondary cache if the particular database page is not found in the primary cache;

if the particular database page is found in the secondary cache, determining a virtual address in the secondary cache where the particular database page resides based on the mapping; and swapping the particular database page found in the secondary cache with a database page in the primary cache, so as to replace a database page in the primary cache with the particular database page from the secondary cache.

2. The method of claim 1, wherein said creating step includes creating the secondary cache using a shared memory file system.

3. The method of claim 2, wherein the shared memory file system is available as part of an operating system on a computer platform on which the database system is running.

4. The method of claim 3, wherein the operating system comprises a Linux operating system.

5. The method of claim 1, wherein said mapping step includes using a memory mapped file function.

6. The method of claim 5, wherein the memory mapped file function is available as part of an operating system on a computer platform on which the database system is running.

7. The method of claim 1, wherein said creating step includes creating the secondary cache on external memory available to the database system.

8. The method of claim 1, wherein said swapping step includes consulting a least recently used (LRU) list maintained for the primary cache to determine the database page to be moved to the secondary cache.

9. The method of claim 8, wherein said swapping step further comprises copying the database page to be moved to the secondary cache to a temporary buffer.

10. The method of claim 9, wherein said swapping step further comprises moving the particular database page from the secondary cache to address of the database page in the primary cache to be moved to the secondary cache.

11. The method of claim 9, wherein said swapping step further comprises moving the database page from the temporary buffer to the secondary cache.

12. The method of claim 11, wherein further comprising:
adding the replaced database page to a most recently used end of a most recently used/least recently used (MRU/LRU) list maintained for the secondary cache.

13. The method of claim 1, wherein said replacing step includes maintaining a least recently used (LRU) list for the primary cache and selecting the database page to be moved to the secondary cache based on said LRU list.

14. The method of claim 1, further comprising:
providing a washing mechanism in the secondary cache for writing database pages in the secondary cache to disk.

15. The method of claim 14, wherein a database page is written from the secondary cache to disk in response to copying a database page from disk to the primary cache.

16. The method of claim 15, wherein the database page written from the secondary cache to disk is selected, based at least in part, on a most recently used/least recently used (MRU/LRU) list maintained for the secondary cache.

17. The method of claim 1, wherein said replacing step includes determining database pages to be maintained in the secondary cache.

18. The method of claim 17, wherein said determining step includes determining database pages to be maintained in the secondary cache based, at least in part, on workload of the database system.

19. The method of claim 1, wherein said replacing step includes substeps of:
moving a database page from the primary cache to the secondary cache; and
reading a database page into the primary cache from disk.

20. The method of claim 19, wherein said substep of moving a database page from the primary cache includes selecting a database page from the primary cache based on a least recently used (LRU) list maintained for the primary cache.

21. The method of claim 19, wherein said substep of moving a database page from the primary cache includes selecting a location for the database page in the secondary cache based on a most recently used/least recently used (MRU/LRU) list maintained for the secondary cache.

22. The method of claim 1, further comprising:
storing on a computer-readable medium processor-executable instructions for performing the method of claim 1.

23. The method of claim 1, further comprising:
downloading a set of processor-executable instructions for performing the method of claim 1.

24. A database system providing extended memory support, the system comprising:
a primary cache for maintaining data pages used by the database system in addressable memory available to the database system;
a secondary cache, created in system memory using a memory mapped file, for maintaining data pages replaced from the primary cache in extended memory available to the database system;
a search module for receiving a request from a user for a particular data page and determining whether the particular data page is in secondary cache if the particular data page is not in the primary cache; and
a module for replacing a data page in the primary cache with the particular data page from the secondary cache if the particular data page is found in the secondary cache.

25. The system of claim 24, wherein the secondary cache is implemented using a shared memory file system.

26. The system of claim 25, wherein the shared memory file system is available as part of an operating system on a computer platform on which the database system is running.

27. The system of claim 26, wherein the operating system comprises a Linux operating system.

28. The system of claim 24, wherein the secondary cache is mapped to the extended memory using a memory mapped file function.

29. The system of claim 28, wherein the memory mapped file function is available as part of an operating system on a computer platform on which the database system is running.

30. The system of claim 24, wherein the secondary cache is created on external memory available to the database system.

31. The system of claim 24, wherein the primary cache includes a least recently used (LRU) list for determining data pages to be moved to the secondary cache.

32. The system of claim 31, wherein the module for replacing consults the LRU list for selecting the data page to be moved to the secondary cache.

33. The system of claim 24, wherein the module for replacing copies the data page to be moved to the secondary cache to a temporary buffer.

34. The system of claim 33, wherein the module for replacing moves the particular data page from the secondary cache to address of the data page in the primary cache to be moved to the secondary cache.

35. The system of claim 33, wherein the module for replacing moves the data page from the temporary buffer to the secondary cache.

36. The system of claim 35, wherein the secondary cache includes a most recently used/least recently used (MRU/LRU) list and the module for replacing adds the data page moved to the secondary cache to the most recently used end of said MRU/LRU list.

37. The system of claim 24, further comprising:
a washing mechanism in the secondary cache for writing data pages in the secondary cache to disk.

38. The system of claim 37, wherein the washing mechanism writes a data page in the secondary cache to disk in response to copying a data page from disk to the primary cache.

39. The system of claim 38, wherein the washing mechanism selects the data page from the secondary cache based, at least in part, on a most recently used/least recently used (MRU/LRU) list maintained for the secondary cache.

40. The system of claim 24, wherein the module for replacing determines data pages to be maintained in the secondary cache.

41. The system of claim 24, further comprising:
a module for reading a page into the primary cache from disk.

42. The system of claim 41, wherein the module for reading selects a data page from the primary cache to be moved to the secondary cache if the primary cache is full.

43. The system of claim 42, wherein the module for reading selects the data page based on a least recently used (LRU) list maintained for the primary cache.

44. The system of claim 42, wherein the module for reading selects a location in the secondary cache for the data page to be moved from the primary cache.

45. The system of claim 44, wherein the module for reading selects the location in the secondary cache based on a most recently used/least recently used (MRU/LRU) list maintained for the secondary cache.

* * * * *